(12) United States Patent
Tanaka et al.

(10) Patent No.: US 10,634,027 B2
(45) Date of Patent: Apr. 28, 2020

(54) EXHAUST PURIFICATION SYSTEM OF INTERNAL COMBUSTION ENGINE

(71) Applicant: TOYOTA JIDOSHA KABUSHIKI KAISHA, Toyota-shi, Aichi-ken (JP)

(72) Inventors: Shogo Tanaka, Toki (JP); Kenji Inoshita, Okazaki (JP); Norihisa Nakagawa, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 36 days.

(21) Appl. No.: 16/170,403

(22) Filed: Oct. 25, 2018

(65) Prior Publication Data
US 2019/0128161 A1 May 2, 2019

(30) Foreign Application Priority Data
Nov. 1, 2017 (JP) ................. 2017-212006

(51) Int. Cl.
| F01N 3/00 | (2006.01) |
| F01N 3/08 | (2006.01) |
| F02D 41/14 | (2006.01) |
| F01N 3/10 | (2006.01) |
| F01N 9/00 | (2006.01) |
| F02D 41/02 | (2006.01) |
| F01N 11/00 | (2006.01) |

(52) U.S. Cl.
CPC ......... *F01N 3/0864* (2013.01); *F01N 3/101* (2013.01); *F01N 9/00* (2013.01); *F01N 11/007* (2013.01); *F02D 41/02* (2013.01); *F02D 41/0295* (2013.01); *F02D 41/1475* (2013.01); *F01N 2430/06* (2013.01); *F01N 2560/025* (2013.01); *F01N 2900/1402* (2013.01)

(58) Field of Classification Search
CPC ............ F02D 41/0295; F02D 41/1441; F02D 41/1475; F02D 41/2454; F01N 3/0864
USPC ......................................... 60/276
See application file for complete search history.

(56) References Cited

U.S. PATENT DOCUMENTS

| 6,357,224 B1 * | 3/2002 | Kawamoto | ........... F01N 3/0842 60/277 |
| 9,624,811 B2 * | 4/2017 | Okazaki | .............. F02D 41/2461 |

(Continued)

FOREIGN PATENT DOCUMENTS

| JP | 2015-071985 | 4/2015 |
| JP | 2015-222046 | 12/2015 |
| JP | 2016-031039 | 3/2016 |

*Primary Examiner* — Jason D Shanske
(74) *Attorney, Agent, or Firm* — Finnegan, Henderson, Farabow, Garrett & Dunner, LLP

(57) ABSTRACT

An exhaust purification system comprises an air-fuel ratio control device. If the air-fuel ratio detected by the downstream side air-fuel ratio sensor 41 reaches a second judged air-fuel ratio, the air-fuel ratio control device sets the target air-fuel ratio to a third set air-fuel ratio when the air-fuel ratio reaches the second judged air-fuel ratio, and switch the target air-fuel ratio from the third set air-fuel ratio to the second set air-fuel ratio when the air-fuel ratio becomes a value at the stoichiometric air-fuel ratio side from the second judged air-fuel ratio. The first set air-fuel ratio, the first judged air-fuel ratio and the second judged air-fuel ratio are an air-fuel ratio in the first region. The second set air-fuel ratio and the third set air-fuel ratio are an air-fuel ratio in a second region at an opposite side from the first region.

6 Claims, 11 Drawing Sheets

(56) References Cited

U.S. PATENT DOCUMENTS

| | | | |
|---|---|---|---|
| 10,132,257 B2* | 11/2018 | Nakagawa | F02D 41/0295 |
| 10,302,035 B2* | 5/2019 | Okazaki | F02D 41/0295 |
| 2003/0017603 A1* | 1/2003 | Uchida | B01D 53/9495 |
| | | | 436/37 |
| 2008/0147297 A1* | 6/2008 | Nakagawa | F02D 41/1454 |
| | | | 701/103 |
| 2010/0146936 A1* | 6/2010 | Sawada | F01N 11/00 |
| | | | 60/277 |
| 2012/0023913 A1* | 2/2012 | Yoshioka | F01N 11/002 |
| | | | 60/285 |
| 2012/0060805 A1* | 3/2012 | Nakano | F02D 41/0235 |
| | | | 123/703 |
| 2013/0231845 A1* | 9/2013 | Onoe | F02D 41/1441 |
| | | | 701/104 |
| 2013/0269324 A1* | 10/2013 | Onoe | F02D 41/1401 |
| | | | 60/285 |
| 2015/0322878 A1* | 11/2015 | Okazaki | F02D 41/0295 |
| | | | 60/285 |
| 2017/0058749 A1* | 3/2017 | Miyamoto | F01N 11/007 |
| 2017/0096926 A1* | 4/2017 | Morihiro | F01N 9/007 |
| 2017/0101950 A1 | 4/2017 | Nakagawa et al. | |
| 2017/0218868 A1 | 8/2017 | Okazaki | |

* cited by examiner

FIG. 1
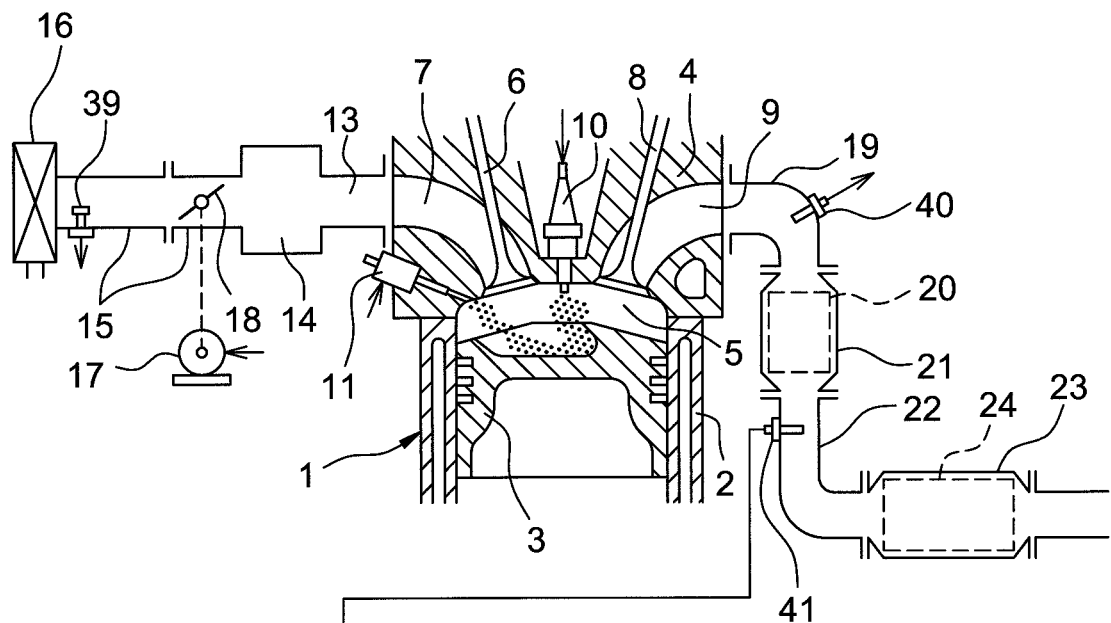
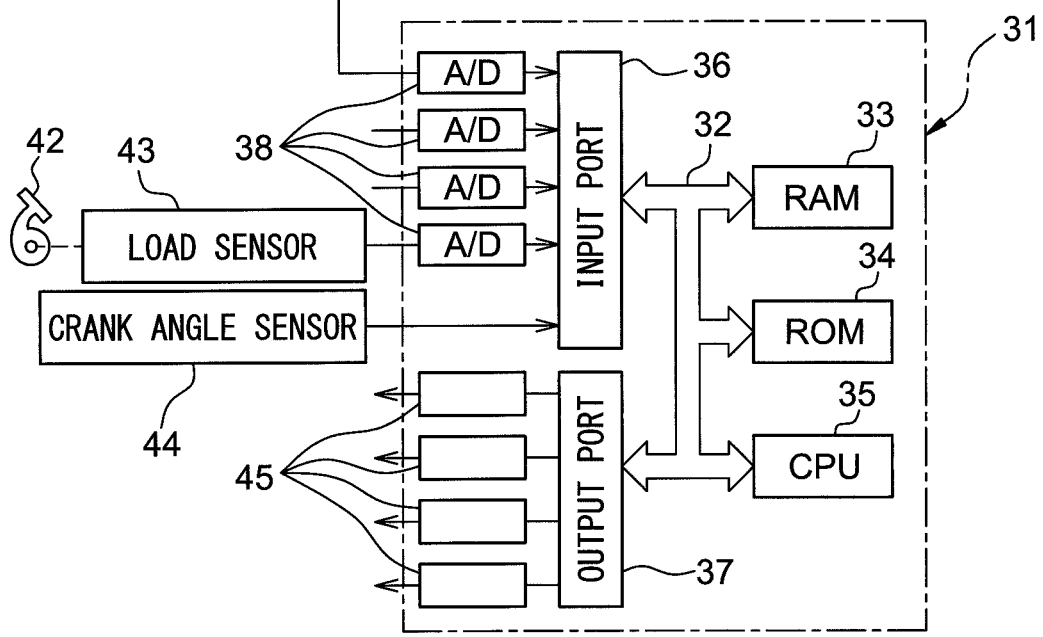

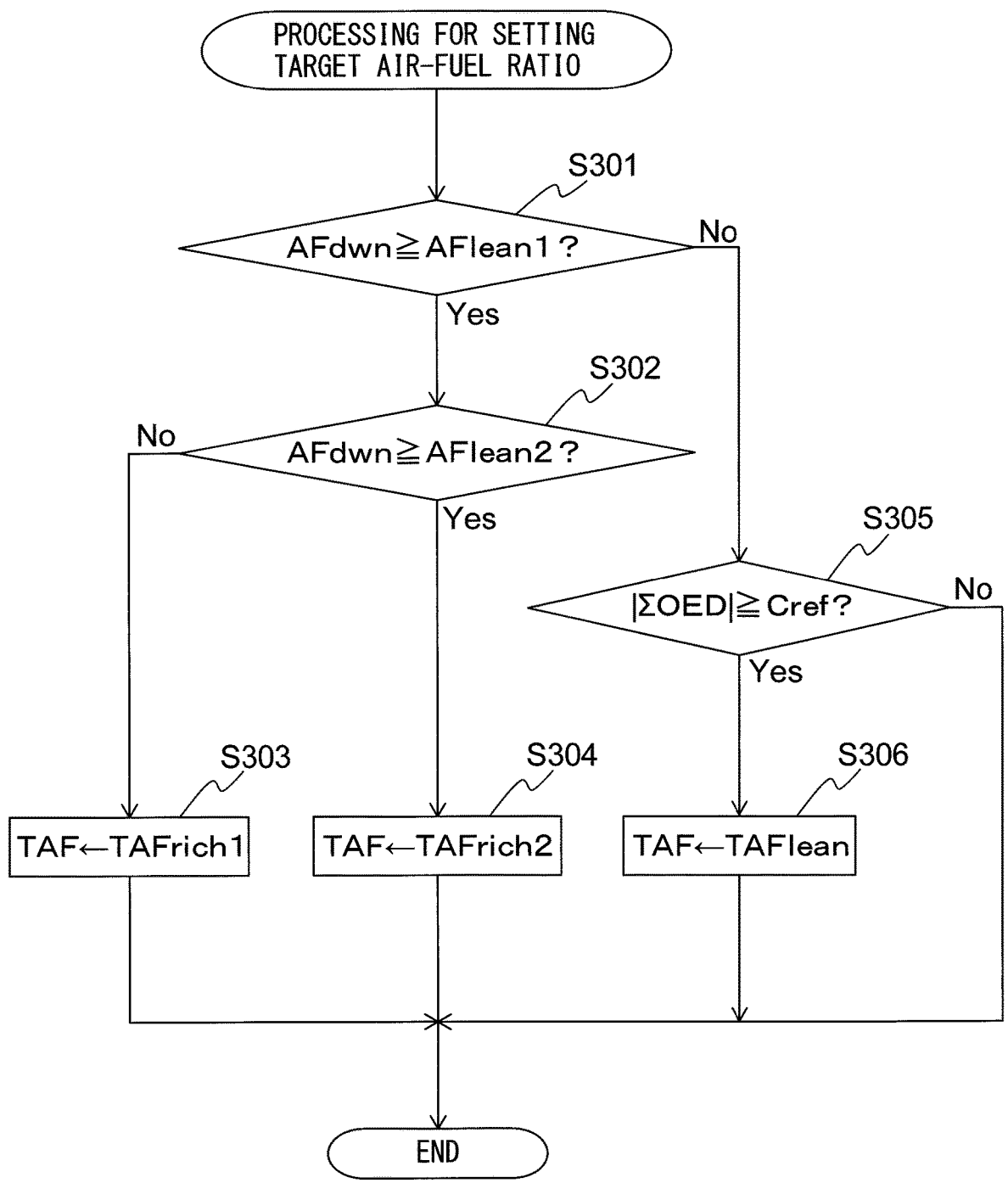

EXHAUST PURIFICATION SYSTEM OF INTERNAL COMBUSTION ENGINE

FIELD

The present invention relates to an exhaust purification system of an internal combustion engine.

BACKGROUND

It has been known in the past to arrange a catalyst able to store oxygen in an exhaust passage of an internal combustion engine and remove unburned gas (HC, CO, etc.) and $NO_X$ in the exhaust gas at the catalyst. The higher the oxygen storage ability of the catalyst, the greater the amount of oxygen which can be stored in the catalyst and the better the exhaust purification performance of the catalyst.

To maintain the oxygen storage ability of the catalyst, the oxygen storage amount of the catalyst preferably is made to fluctuate so that the oxygen storage amount of the catalyst is not maintained constant. In the internal combustion engine described in PTL 1, to make the oxygen storage amount of the catalyst fluctuate, the target air-fuel ratio of the exhaust gas flowing into the catalyst is alternately switched between a lean air-fuel ratio leaner than a stoichiometric air-fuel ratio and a rich air-fuel ratio richer than the stoichiometric air-fuel ratio.

Specifically, in the internal combustion engine described in PTL 1, when the air-fuel ratio detected by the downstream side air-fuel ratio sensor becomes a rich judged air-fuel ratio richer than the stoichiometric air-fuel ratio or becomes less, the target air-fuel ratio is set to the lean air-fuel ratio, while when the air-fuel ratio detected by the downstream side air-fuel ratio sensor becomes a lean judged air-fuel ratio leaner than the stoichiometric air-fuel ratio or becomes more, the target air-fuel ratio is set to the rich air-fuel ratio. In the internal combustion engine described in PTL 2, when the air-fuel ratio detected by the downstream side air-fuel ratio sensor becomes a rich judged air-fuel ratio richer than the stoichiometric air-fuel ratio or becomes less, the target air-fuel ratio is set to the lean air-fuel ratio, while when the estimated value of the oxygen storage amount of the catalyst becomes a switching reference storage amount or more, the target air-fuel ratio is set to the rich air-fuel ratio.

CITATION LIST

Patent Literature

PTL 1: Japanese Patent Publication No. 2015-222046A
PTL 2: Japanese Patent Publication No. 2016-31039A

SUMMARY

Technical Problem

In this regard, when a vehicle mounting an internal combustion engine accelerates, decelerates, etc., the air-fuel ratio of the exhaust gas flowing into the catalyst sometimes temporarily deviates from the target air-fuel ratio due to external disturbance. When the air-fuel ratio detected by the downstream side air-fuel ratio sensor is near the lean judged air-fuel ratio, the oxygen storage amount of the catalyst is close to the maximum oxygen storage amount. For this reason, if the air-fuel ratio of the exhaust gas flowing into the catalyst deviates to the lean side from the target air-fuel ratio when the air-fuel ratio detected by the downstream side air-fuel ratio sensor is near the lean judged air-fuel ratio, a large amount of $NO_X$ is liable to flow out from the catalyst.

Further, when the air-fuel ratio detected by the downstream side air-fuel ratio sensor is near the rich judged air-fuel ratio, the oxygen storage amount of the catalyst is close to zero. For this reason, if the air-fuel ratio of the exhaust gas flowing into the catalyst deviates to the rich side from the target air-fuel ratio when the air-fuel ratio detected by the downstream side air-fuel ratio sensor is near the rich judged air-fuel ratio, a large amount of unburned gas is liable to flow out from the catalyst.

As opposed to this, in the internal combustion engine described in PTL 2, to keep unburned gas from flowing out, the target air-fuel ratio is switched from the rich air-fuel ratio to the lean air-fuel ratio, then the lean degree of the lean air-fuel ratio is enlarged for exactly a predetermined time. However, if the lean degree of the lean air-fuel ratio is made larger regardless of the presence or absence of external disturbance, the time period until the estimated value of the oxygen storage amount of the catalyst reaches the switching reference storage amount or the time period until the air-fuel ratio detected by the downstream side air-fuel ratio sensor reaches the lean judged air-fuel ratio becomes always short. That is, the time period during which the target air-fuel ratio is set to the lean air-fuel ratio becomes shorter. As a result, the time period during which the target air-fuel ratio is set to the rich air-fuel ratio becomes relatively long compared with the time period during which the target air-fuel ratio is set to the lean air-fuel ratio. For this reason, during operation of the internal combustion engine, the time period during which the target air-fuel ratio is set to an air-fuel ratio richer than the stoichiometric air-fuel ratio becomes long and the fuel efficiency of the internal combustion engine deteriorates.

Similarly, to keep $NO_X$ from flowing out, it may be considered to switch the target air-fuel ratio from the lean air-fuel ratio to the rich air-fuel ratio, then enlarge the rich degree of the rich air-fuel ratio for exactly a predetermined time. However, if the rich degree of the rich air-fuel ratio is enlarged regardless of any external disturbance, the fuel injection amount will become always great when the target air-fuel ratio is set to the rich air-fuel ratio and the fuel efficiency will deteriorate.

Therefore, in consideration of the above problem, an object of the present invention is to provide an exhaust purification system of an internal combustion engine which can keep the fuel efficiency from deteriorating while keeping the exhaust emission from deteriorating.

Solution to Problem

The summary of the present disclosure is as follows.

(1) An exhaust purification system of an internal combustion engine comprising: a catalyst arranged in an exhaust passage and able to store oxygen; a downstream side air-fuel ratio sensor arranged at a downstream side of the catalyst in a direction of flow of exhaust and detecting an air-fuel ratio of outflowing exhaust gas flowing out from the catalyst; and an air-fuel ratio control device configured to control an air-fuel ratio of inflowing exhaust gas flowing into the catalyst to a target air-fuel ratio, wherein the air-fuel ratio control device is configured to set the target air-fuel ratio to a first set air-fuel ratio, then, switch the target air-fuel ratio from the first set air-fuel ratio to a second set air-fuel ratio when the air-fuel ratio detected by the downstream side air-fuel ratio sensor reaches a first judged air-fuel ratio, the first set air-fuel ratio and the first judged air-fuel ratio are air-fuel ratios in a first region richer or leaner than a stoichiometric air-fuel ratio, and the second set air-fuel ratio is an air-fuel ratio in a second region at an opposite side from the first region across the stoichiometric air-fuel ratio, if the air-fuel ratio detected by the downstream side air-fuel ratio sensor reaches a second judged air-fuel ratio, the air-fuel ratio control device is configured to set the target air-fuel ratio to a third set air-fuel ratio when the air-fuel ratio detected by the downstream side air-fuel ratio sensor reaches the second judged air-fuel ratio, and switch the target air-fuel ratio from the third set air-fuel ratio to the second set air-fuel ratio when the air-fuel ratio detected by the downstream side air-fuel ratio sensor becomes a value at the stoichiometric air-fuel ratio side from the second judged air-fuel ratio, and the second judged air-fuel ratio is an air-fuel ratio in the first region, a difference of the second judged air-fuel ratio and the stoichiometric air-fuel ratio is larger than a difference of the first judged air-fuel ratio and the stoichiometric air-fuel ratio, the third set air-fuel ratio is an air-fuel ratio in the second region, and a difference of the third set air-fuel ratio and the stoichiometric air-fuel ratio is larger than a difference of the second set air-fuel ratio and the stoichiometric air-fuel ratio.

(2) The exhaust purification system of an internal combustion engine described in above (1), wherein the air-fuel ratio control device is configured to set the target air-fuel ratio to the second set air-fuel ratio, then switch the target air-fuel ratio from the second set air-fuel ratio to the first set air-fuel ratio when the air-fuel ratio detected by the downstream side air-fuel ratio sensor reaches a third judged air-fuel ratio, if the air-fuel ratio detected by the downstream side air-fuel ratio sensor reaches a fourth judged air-fuel ratio, the air-fuel ratio control device is configured to set the target air-fuel ratio to a fourth set air-fuel ratio when the air-fuel ratio detected by the downstream side air-fuel ratio sensor reaches the fourth judged air-fuel ratio, and switch the target air-fuel ratio from the fourth set air-fuel ratio to the first set air-fuel ratio when the air-fuel ratio detected by the downstream side air-fuel ratio sensor becomes a value at the stoichiometric air-fuel ratio side from the fourth judged air-fuel ratio, and the third judged air-fuel ratio and the fourth judged air-fuel ratio are air-fuel ratios in the second region, a difference between the fourth judged air-fuel ratio and the stoichiometric air-fuel ratio is greater than a difference between the third judged air-fuel ratio and the stoichiometric air-fuel ratio, the fourth set air-fuel ratio is an air-fuel ratio in the first region, and a difference of the fourth set air-fuel ratio and the stoichiometric air-fuel ratio is larger than a difference between the first set air-fuel ratio and the stoichiometric air-fuel ratio.

(3) The exhaust purification system of an internal combustion engine described in above (1), wherein the air-fuel ratio control device is configured to switch the target air-fuel ratio from the second set air-fuel ratio to the first set air-fuel ratio when judging that an amount of change of an oxygen storage amount of the catalyst when the target air-fuel ratio is maintained at the air-fuel ratio in the second region has reached a reference amount.

(4) The exhaust purification system of an internal combustion engine described in any one of above (1) to (3), further comprising an upstream side air-fuel ratio sensor arranged at an upstream side of the catalyst in the direction of flow of exhaust and detecting an air-fuel ratio of the inflowing exhaust gas, wherein the air-fuel ratio control device is configured to control an amount of fuel supplied to combustion chambers by feedback so that the air-fuel ratio detected by the upstream side air-fuel ratio sensor matches the target air-fuel ratio.

Advantageous Effects of Invention

According to the present invention, there is provided an exhaust purification system of an internal combustion engine which can keep the fuel efficiency from deteriorating while keeping the exhaust emission from deteriorating.

BRIEF DESCRIPTION OF DRAWINGS

FIG. 1 is a view schematically showing an internal combustion engine in which an exhaust purification system of an internal combustion engine according to a first embodiment of the present invention is provided.

FIG. 12 is a flow chart showing a control routine of processing for setting a target air-fuel ratio in the third embodiment.

DESCRIPTION OF EMBODIMENTS

Figure 2:
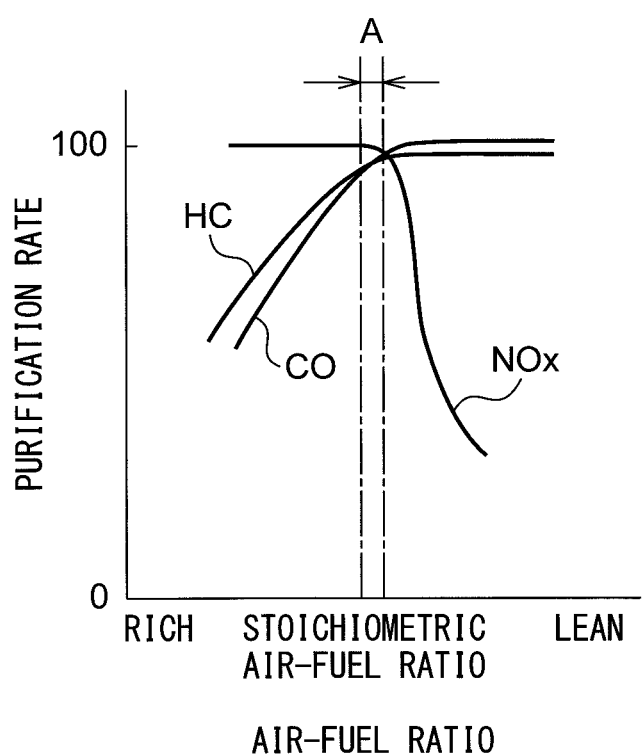
FIG. 2 shows purification characteristics of a three-way catalyst.

Below, referring to the figures, embodiments of the present invention will be explained in detail. Note that, in the following explanation, similar components are assigned the same reference numerals.

First Embodiment

First, referring to FIG. 1 to FIG. 7, a first embodiment of the present invention will be explained.

<Explanation of Internal Combustion Engine Overall>

FIG. 1 is a view schematically showing an internal combustion engine provided with an exhaust purification system of an internal combustion engine according to a first embodiment of the present invention. The internal combustion engine shown in FIG. 1 is a spark ignition type internal combustion engine. The internal combustion engine is mounted in a vehicle.

Referring to FIG. 1, 1 indicates an engine body, 2 a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, at the center part of the inside wall surface of the cylinder head 4, a spark plug 10 is arranged. A fuel injector 11 is arranged around the inside wall surface of the cylinder head 4. The spark plug 10 is configured to cause generation of a spark in accordance with an ignition signal. Further, the fuel injector 11 injects a predetermined amount of fuel into the combustion chamber 5 in accordance with an injection signal. In the present embodiment, as the fuel, gasoline with a stoichiometric air-fuel ratio of 14.6 is used.

The intake port 7 in each cylinder is connected through a corresponding intake runner 13 to a surge tank 14. The surge tank 14 is connected through an intake pipe 15 to an air cleaner 16. The intake port 7, intake runner 13, surge tank 14, intake pipe 15, etc., form an intake passage which leads air to the combustion chamber 5. Further, inside the intake pipe 15, a throttle valve 18 which is driven by a throttle valve drive actuator 17 is arranged. The throttle valve 18 can be turned by the throttle valve drive actuator 17 to thereby change the opening area of the intake passage.

On the other hand, the exhaust port 9 in each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which has an upstream side catalyst 20 built into it. The upstream side casing 21 is connected to a downstream side casing 23 which has a downstream side catalyst 24 built into it via an exhaust pipe 22. The exhaust port 9, exhaust manifold 19, upstream side casing 21, exhaust pipe 22, downstream side casing 23, etc., form an exhaust passage which discharges exhaust gas produced due to combustion of the air-fuel mixture in the combustion chamber 5.

Various control routines of the internal combustion engine are performed by an electronic control unit (ECU) 31. The ECU 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an air flow meter 39 detecting the flow rate of air which flows through the intake pipe 15 is arranged. The output of the air flow meter 39 is input through a corresponding AD converter 38 to the input port 36.

Further, at the header of the exhaust manifold 19, i.e., a upstream side of the upstream side catalyst 20 in the direction of flow of exhaust, an upstream side air-fuel ratio sensor 40 detecting the air-fuel ratio of the exhaust gas which flows through the inside of the exhaust manifold 19 (that is, the exhaust gas which flows into the upstream side catalyst 20) is arranged. The output of the upstream air-fuel ratio sensor 40 is input through the corresponding AD converter 38 to the input port 36.

Further, inside the exhaust pipe 22, that is, at the downstream side of the upstream side catalyst 20 in the direction of flow of exhaust, a downstream side air-fuel ratio sensor 41 for detecting an air-fuel ratio of the exhaust gas flowing through the inside of the exhaust pipe 22 (that is, exhaust gas flowing out from the upstream side catalyst 20) is arranged. The output of the downstream side air-fuel ratio sensor 41 is input through a corresponding AD converter 38 to the input port 36.

Further, an accelerator pedal 42 is connected to a load sensor 43 generating an output voltage proportional to the amount of depression of the accelerator pedal 42. The output voltage of the load sensor 43 is input through a corresponding AD converter 38 to the input port 36. A crank angle sensor 44 generates an output pulse every time the crankshaft rotates, for example, by 15 degrees. This output pulse is input to the input port 36. In the CPU 35, the engine speed is calculated from the output pulse of the crank angle sensor 44. On the other hand, the output port 37 is connected through corresponding drive circuits 45 to the spark plugs 10, fuel injectors 11, and the throttle valve drive actuator 17.

Note that, the above-mentioned internal combustion engine is a nonsupercharged internal combustion engine fueled by gasoline, but the configuration of the internal combustion engine is not limited to the above configuration. Therefore, the cylinder array, mode of injection of fuel, configuration of the intake and exhaust systems, configuration of the valve operating mechanism, presence of any supercharger, and other specific parts of the configuration of the internal combustion engine may differ from the configuration shown in FIG. 1. For example, the fuel injectors 11 may be arranged to inject fuel into the intake ports 7.

<Explanation of Catalysts>

The upstream side catalyst 20 and the downstream side catalyst 24 arranged in the exhaust passage have similar configurations. The catalysts 20 and 24 are catalysts having oxygen storage abilities, for example, three-way catalysts. Specifically, the catalysts 20 and 24 are comprised of carriers made of ceramic on which a precious metal having a catalytic action (for example, platinum (Pt)) and a co-catalyst having an oxygen storage ability (for example, ceria ($CeO_2$)) are carried.

FIG. 2 shows the purification characteristics of a three-way catalyst. As shown in FIG. 2, the purification rates of unburned gas (HC, CO) and nitrogen oxides ($NO_X$) by the catalysts 20 and 24 become extremely high when the air-fuel ratio of the exhaust gas flowing into the catalysts 20 and 24 is in the region near the stoichiometric air-fuel ratio (purification window A in FIG. 2). Therefore, the catalysts 20 and 24 can effectively remove unburned gas and $NO_X$ if the air-fuel ratio of the exhaust gas is maintained at the stoichiometric air-fuel ratio.

Further, the catalysts 20 and 24 store or release oxygen in accordance with the air-fuel ratio of the exhaust gas by the co-catalyst. Specifically, the catalysts 20 and 24 store excess oxygen in the exhaust gas when the air-fuel ratio of the exhaust gas is leaner than the stoichiometric air-fuel ratio. On the other hand, the catalysts 20 and 24 release the amount of additional oxygen required for making the unburned gas oxidize when the air-fuel ratio of the exhaust gas is richer than the stoichiometric air-fuel ratio. As a result, even if the air-fuel ratio of the exhaust gas is somewhat off from the stoichiometric air-fuel ratio, the air-fuel ratio on the surface of the catalysts 20 and 24 is maintained near the stoichiometric air-fuel ratio and the unburned gas and $NO_X$ are effectively removed at the catalysts 20 and 24.

Note that, so long as the catalysts 20 and 24 have catalytic actions and oxygen storage abilities, they may be catalysts other than three-way catalysts.

<Output Characteristics of Air-Fuel Ratio Sensors>

Figure 3:
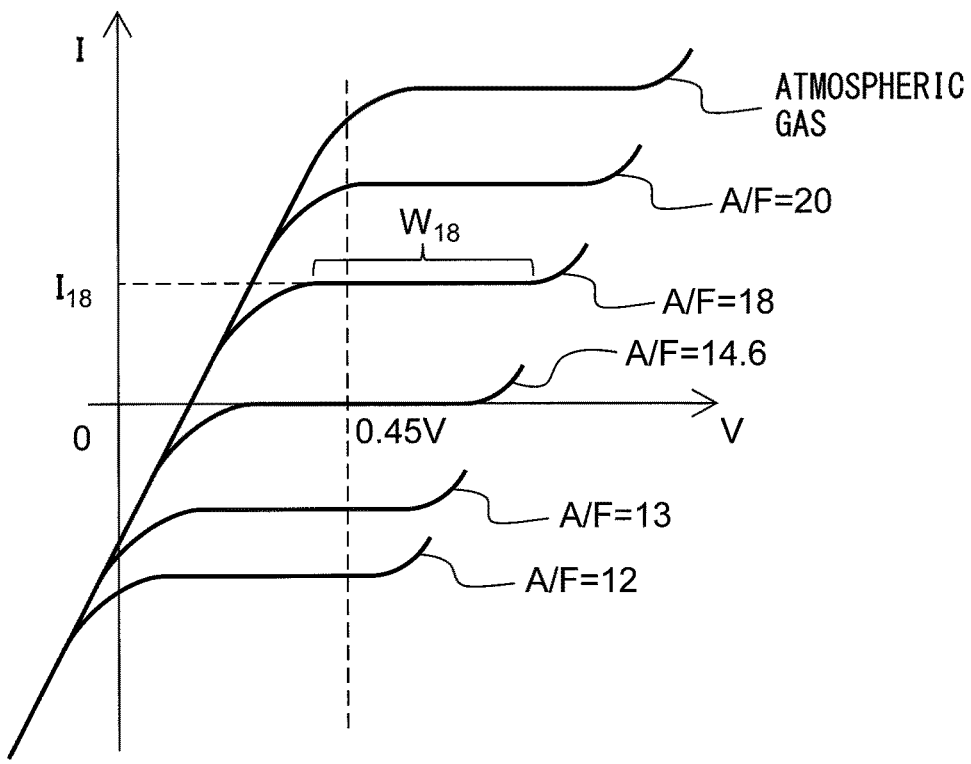
FIG. 3 is a view showing a relationship between a sensor applied voltage and output current at different exhaust air-fuel ratios.
Figure 4:
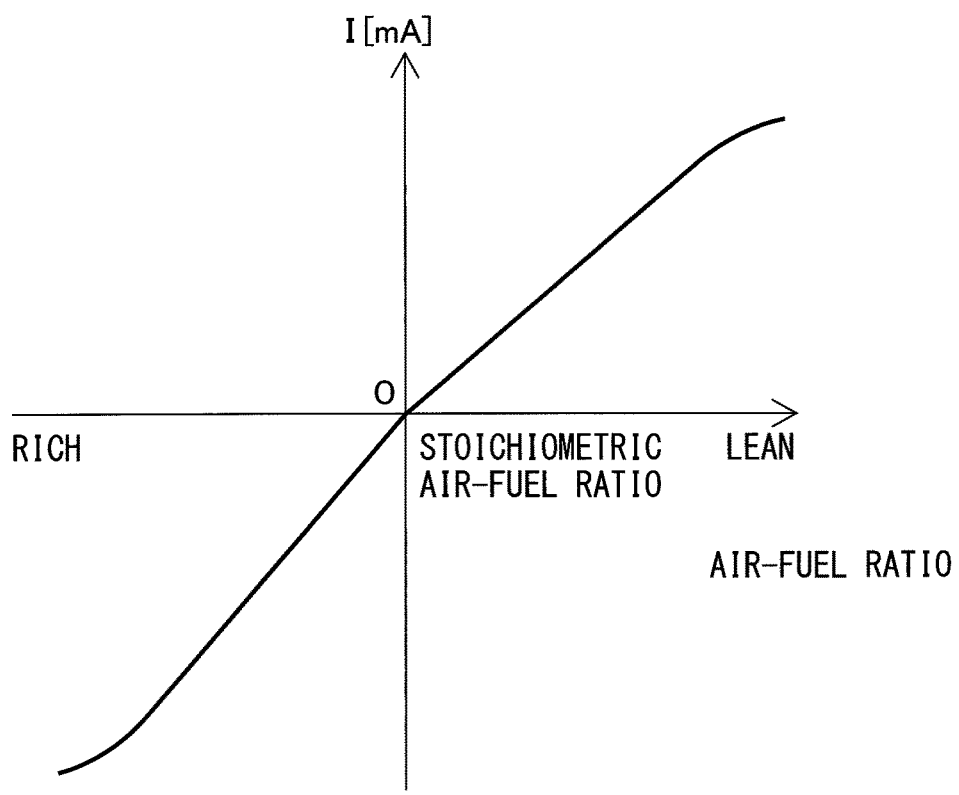
FIG. 4 is a view showing a relationship between an exhaust air-fuel ratio and output current when making the sensor applied voltage constant.

Next, referring to FIG. 3 and FIG. 4, the output characteristics of the air-fuel ratio sensors 40, 41 in the present embodiment will be explained. FIG. 3 is a view showing the voltage-current (V-I) characteristics of the air-fuel ratio sensors 40, 41 in the present embodiment, while FIG. 4 is a view showing the relationship between the air-fuel ratio of the exhaust gas circulating around the air-fuel ratio sensors 40, 41 (below, referred to as the "exhaust air-fuel ratio") and the output current I when maintaining the applied voltage constant. Note that, in the present embodiment, as the air-fuel ratio sensors 40, 41, the same configurations of air-fuel ratio sensors are used.

As will be understood from FIG. 3, in the air-fuel ratio sensors 40, 41 of the present embodiment, the output current I becomes larger the higher the exhaust air-fuel ratio (the leaner). Further, in the V-I line of each exhaust air-fuel ratio, there is a region substantially parallel to the V-axis, that is, a region where the output current does not change much at all even if the applied voltage changes. This voltage region is called the "limit current region". The current at this time is called the "limit current". In FIG. 3, the limit current region and the limit current when the exhaust air-fuel ratio is 18 are respectively shown by $W_{18}$ and $I_{18}$. Therefore, the air-fuel ratio sensors 40, 41 are limit current type air-fuel ratio sensors.

FIG. 4 is a view showing the relationship between the exhaust air-fuel ratio and the output current I when making the applied voltage 0.45V or so. As will be understood from FIG. 4, in the air-fuel ratio sensors 40, 41, the higher the exhaust air-fuel ratio (that is, the leaner), the greater the output current I of the air-fuel ratio sensors 40, 41 becomes. In addition, the air-fuel ratio sensors 40, 41 are configured so that the output current I becomes zero when the exhaust air-fuel ratio is the stoichiometric air-fuel ratio. Accordingly, the air-fuel ratio sensors 40, 41 can continuously (linearly) detect the exhaust air-fuel ratio. Note that, when the exhaust air-fuel ratio becomes larger by a certain extent or more or when it becomes smaller by a certain extent or less, the ratio of the change of the output current with respect to the change of the exhaust air-fuel ratio becomes smaller.

Note that, in the above example, as the air-fuel ratio sensors 40, 41, limit current type air-fuel ratio sensors are used. However, so long as the output current linearly changes with respect to the exhaust air-fuel ratio, as the air-fuel ratio sensors 40, 41, it is also possible to use any other air-fuel ratio sensors such as air-fuel ratio sensors not the limit current type. Further, the air-fuel ratio sensors 40, 41 may also be air-fuel ratio sensors of structures different from each other.

<Exhaust Purification System of Internal Combustion Engine>

Below, an exhaust purification system of an internal combustion engine according to a first embodiment of the present invention (below, simply referred to as the "exhaust purification system") will be explained. The exhaust purification system comprises an upstream side catalyst 20, downstream side catalyst 24, upstream side air-fuel ratio sensor 40, downstream side air-fuel ratio sensor 41, and air-fuel ratio control device. In the present embodiment, the ECU 31 functions as the air-fuel ratio control device.

The air-fuel ratio control device controls the air-fuel ratio of the exhaust gas flowing into the upstream side catalyst 20 (below, referred to as the "inflowing exhaust gas") to a target air-fuel ratio. Specifically, the air-fuel ratio control device sets the target air-fuel ratio of the inflowing exhaust gas and controls the amount of fuel supplied to the combustion chambers 5 so that the air-fuel ratio of the inflowing exhaust gas matches the target air-fuel ratio. In the present embodiment, the air-fuel ratio control device controls by feedback the amount of fuel supplied to the combustion chambers 5 so that the output air-fuel ratio of the upstream side air-fuel ratio sensor 40 matches the target air-fuel ratio. Note that, "the output air-fuel ratio" means the air-fuel ratio corresponding to the output value of the air-fuel ratio sensor, that is, the air-fuel ratio detected by the air-fuel ratio sensor.

Further, the air-fuel ratio control device may, without using the upstream side air-fuel ratio sensor 40, control the amount of fuel supplied to the combustion chambers 5 so that the air-fuel ratio of the inflowing exhaust gas matches the target air-fuel ratio. In this case, the air-fuel ratio control device supplies the combustion chambers 5 with the amount of fuel calculated from the intake air amount detected by the air flow meter 39 and the target air-fuel ratio so that the ratio of the fuel and air supplied to the combustion chambers 5 matches the target air-fuel ratio.

The air-fuel ratio control device makes the oxygen storage amount of the upstream side catalyst 20 fluctuate so as to keep the oxygen storage ability of the upstream side catalyst 20 from falling by alternately switching the target air-fuel ratio of the inflowing exhaust gas between an air-fuel ratio richer than the stoichiometric air-fuel ratio and an air-fuel ratio leaner than the stoichiometric air-fuel ratio. Specifically, the air-fuel ratio control device switches the target air-fuel ratio from a first rich set air-fuel ratio to a first lean set air-fuel ratio when the output air-fuel ratio of the downstream side air-fuel ratio sensor 41 reaches a first rich judged air-fuel ratio and switches the target air-fuel ratio from the first lean set air-fuel ratio to the first rich set air-fuel ratio when the output air-fuel ratio of the downstream side air-fuel ratio sensor 41 reaches a first lean judged air-fuel ratio.

The first rich set air-fuel ratio and first rich judged air-fuel ratio are preset and are air-fuel ratios richer than the stoichiometric air-fuel ratio (in the present embodiment, 14.6). Further, the first rich set air-fuel ratio is richer than the first rich judged air-fuel ratio. That is, the rich degree of the first rich set air-fuel ratio is larger than the rich degree of the first rich judged air-fuel ratio. Note that, the "rich degree" means the difference between an air-fuel ratio richer than the stoichiometric air-fuel ratio and the stoichiometric air-fuel ratio.

The first lean set air-fuel ratio and first lean judged air-fuel ratio are preset and are air-fuel ratios leaner than the stoichiometric air-fuel ratio. Further, the first lean set air-fuel ratio is leaner than the first lean judged air-fuel ratio. That is, the lean degree of the first lean set air-fuel ratio is larger than the lean degree of the first lean judged air-fuel ratio. Note that, the "lean degree" means the difference between an air-fuel ratio leaner than the stoichiometric air-fuel ratio and the stoichiometric air-fuel ratio.

The first rich judged air-fuel ratio is set to an air-fuel ratio corresponding to the output of the downstream side air-fuel ratio sensor 41 when the oxygen storage amount of the upstream side catalyst 20 decreases and the atmosphere of the upstream side catalyst 20 changes from the stoichiometric air-fuel ratio to rich. On the other hand, the first lean judged air-fuel ratio is set to an air-fuel ratio corresponding to the output of the downstream side air-fuel ratio sensor 41 when the oxygen storage amount of the upstream side catalyst 20 increases and the atmosphere of the upstream side catalyst 20 changes from the stoichiometric air-fuel ratio to lean. Therefore, when the output air-fuel ratio of the downstream side air-fuel ratio sensor 41 is between the first rich judged air-fuel ratio and the first lean judged air-fuel ratio, it is judged that the atmosphere of the upstream side catalyst 20 is the stoichiometric air-fuel ratio.

In this regard, at the time of acceleration, deceleration, etc., of the vehicle mounting the internal combustion engine, due to external disturbance, sometimes the air-fuel ratio of the inflowing exhaust gas temporarily deviates from the target air-fuel ratio. When the output air-fuel ratio of the downstream side air-fuel ratio sensor 41 is near the first lean judged air-fuel ratio, the oxygen storage amount of the upstream side catalyst 20 is close to the maximum oxygen storage amount. For this reason, if the air-fuel ratio of the inflowing exhaust gas deviates to the lean side from the target air-fuel ratio when the output air-fuel ratio of the downstream side air-fuel ratio sensor 41 is near the first lean judged air-fuel ratio, a large amount of $NO_X$ is liable to flow out from the upstream side catalyst 20. In this case, to keep $NO_X$ from flowing out, the rich degree of the air-fuel ratio of the inflowing exhaust gas has to be made larger.

For this reason, in the present embodiment, if the output air-fuel ratio of the downstream side air-fuel ratio sensor 41 reaches the second lean judged air-fuel ratio, the air-fuel ratio control device sets the target air-fuel ratio to the second rich set air-fuel ratio when the output air-fuel ratio of the downstream side air-fuel ratio sensor 41 reaches the second lean judged air-fuel ratio and switches the target air-fuel ratio from the second rich set air-fuel ratio to the first rich set air-fuel ratio when the output air-fuel ratio of the downstream side air-fuel ratio sensor 41 becomes a value at the stoichiometric air-fuel ratio side from the second lean judged air-fuel ratio. In other words, if the output air-fuel ratio of the downstream side air-fuel ratio sensor 41 reaches the second lean judged air-fuel ratio, the air-fuel ratio control device maintains the target air-fuel ratio at the second rich set air-fuel ratio from when the output air-fuel ratio of the downstream side air-fuel ratio sensor 41 reaches the second lean judged air-fuel ratio until it becomes a value at the stoichiometric air-fuel ratio side from the second lean judged air-fuel ratio.

The second lean judged air-fuel ratio is preset and is an air-fuel ratio leaner than the stoichiometric air-fuel ratio. Further, the second lean judged air-fuel ratio is leaner than the first lean judged air-fuel ratio. That is, the lean degree of the second lean judged air-fuel ratio is larger than the lean degree of the first lean judged air-fuel ratio. Further, the second lean judged air-fuel ratio is set to an air-fuel ratio corresponding to the output of the downstream side air-fuel ratio sensor 41 when a predetermined amount of $NO_X$ flows out from the upstream side catalyst 20.

The second rich set air-fuel ratio is preset and is an air-fuel ratio richer than the stoichiometric air-fuel ratio. Further, the second rich set air-fuel ratio is richer than the first rich set air-fuel ratio. That is, the rich degree of the second rich set air-fuel ratio is larger than the rich degree of the first rich set air-fuel ratio.

On the other hand, when the output air-fuel ratio of the downstream side air-fuel ratio sensor 41 is near the first rich judged air-fuel ratio, the oxygen storage amount of the upstream side catalyst 20 is close to zero. For this reason, if the air-fuel ratio of the inflowing exhaust gas deviates to the rich side from the target air-fuel ratio when the output air-fuel ratio of the downstream side air-fuel ratio sensor 41 is close to the first rich judged air-fuel ratio, a large amount of unburned gas is liable to flow out from the upstream side catalyst 20. In this case, to keep unburned gas from flowing out, the lean degree of the air-fuel ratio of the inflowing exhaust gas has to be made larger.

For this reason, in the present embodiment, if the output air-fuel ratio of the downstream side air-fuel ratio sensor 41 reaches the second rich judged air-fuel ratio, the air-fuel ratio control device sets the target air-fuel ratio to the second lean set air-fuel ratio when the output air-fuel ratio of the downstream side air-fuel ratio sensor 41 reaches the second rich judged air-fuel ratio and switches the target air-fuel ratio from the second lean set air-fuel ratio to the first lean set air-fuel ratio when the output air-fuel ratio of the downstream side air-fuel ratio sensor 41 becomes a value at the stoichiometric air-fuel ratio side from the second rich judged air-fuel ratio. In other words, if the output air-fuel ratio of the downstream side air-fuel ratio sensor 41 reaches the second rich judged air-fuel ratio, the air-fuel ratio control device maintains the target air-fuel ratio at the second lean set air-fuel ratio from when the output air-fuel ratio of the downstream side air-fuel ratio sensor 41 reaches the second rich judged air-fuel ratio until it becomes a value at the stoichiometric air-fuel ratio side from the second rich judged air-fuel ratio.

The second rich judged air-fuel ratio is preset and is an air-fuel ratio richer than the stoichiometric air-fuel ratio. Further, the second rich judged air-fuel ratio is richer than the first rich judged air-fuel ratio. That is, the rich degree of the second rich judged air-fuel ratio is larger than the rich degree of the first rich judged air-fuel ratio. Further, the second rich judged air-fuel ratio is set to an air-fuel ratio corresponding to the output of the downstream side air-fuel ratio sensor 41 when a predetermined amount of unburned gas flows out from the upstream side catalyst 20.

The second lean set air-fuel ratio is preset and is an air-fuel ratio leaner than the stoichiometric air-fuel ratio. Further, the second lean set air-fuel ratio is leaner than the first lean set air-fuel ratio. That is, the lean degree of the second lean set air-fuel ratio is larger than the lean degree of the first lean set air-fuel ratio.

<Explanation of Air-Fuel Ratio Control Using Time Chart>

Figure 5:
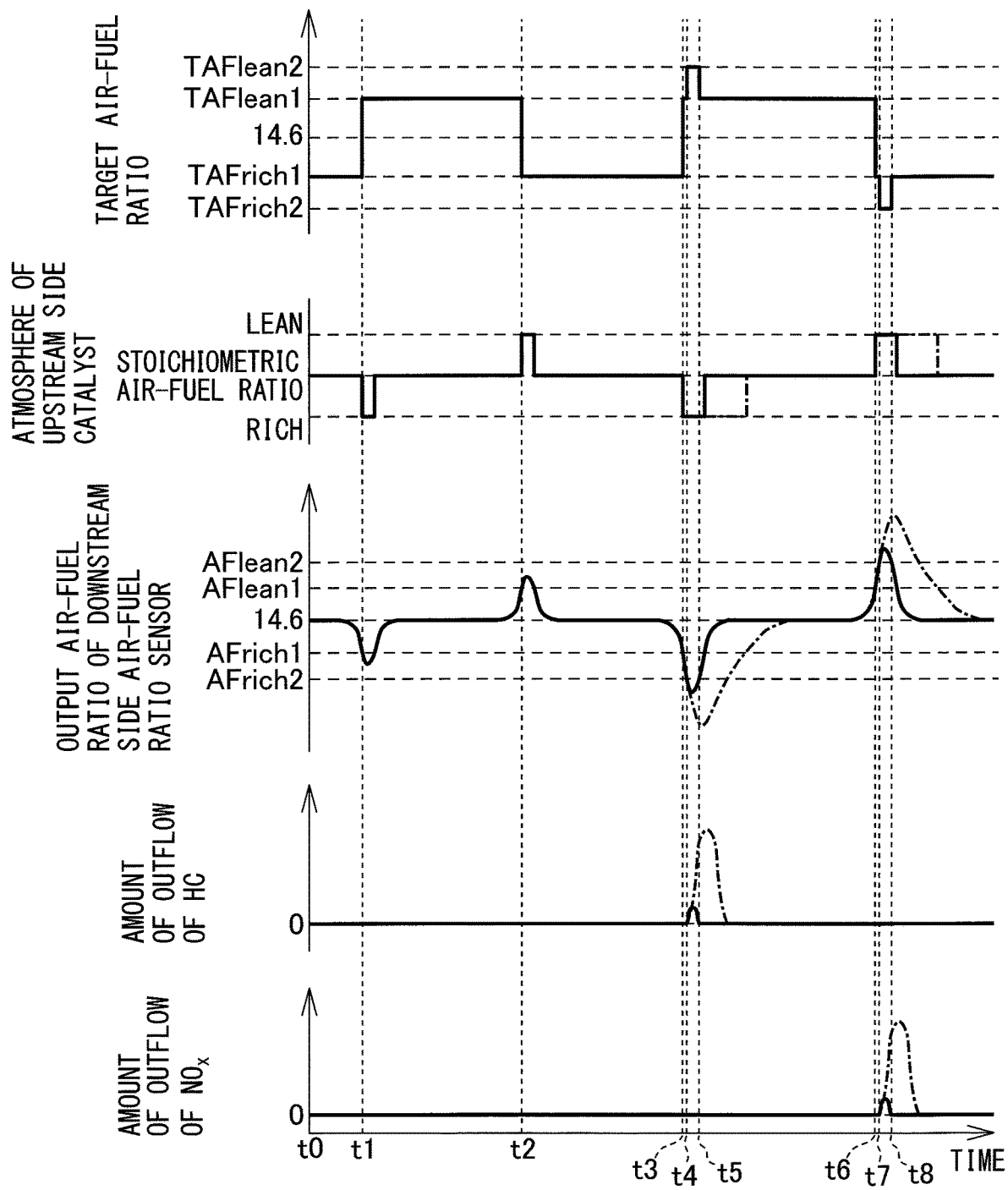
FIG. 5 is a time chart of a target air-fuel ratio of inflowing exhaust gas etc., when the air-fuel ratio control in the first embodiment is performed.

Referring to FIG. 5, the air-fuel ratio control in the present embodiment will be explained specifically. FIG. 5 is a time chart of parameters when the air-fuel ratio control in the first embodiment is performed such as the target air-fuel ratio of the inflowing exhaust gas, the atmosphere of the upstream side catalyst 20, the output air-fuel ratio of the downstream side air-fuel ratio sensor 41, the amount of HC flowing out from the upstream side catalyst 20, and the amount of $NO_X$ flowing out from the upstream side catalyst 20. In FIG. 5, the solid line shows the time chart at the present embodiment, while the one-dot chain line shows the time chart in a comparative example of the present embodiment.

In the illustrated example, at the time t0, the target air-fuel ratio is set to the first rich set air-fuel ratio TAFrich1 and the air-fuel ratio of the inflowing exhaust gas becomes richer than the stoichiometric air-fuel ratio. For this reason, the upstream side catalyst 20 discharges an amount of oxygen corresponding to the amount insufficient for oxidizing the unburned gas. At the time t0, the oxygen storage amount of the upstream side catalyst 20 is sufficient and the atmosphere of the upstream side catalyst 20 is the stoichiometric air-fuel ratio. In this case, due to the purifying action of the upstream side catalyst 20, the exhaust gas flowing out from the upstream side catalyst 20 (below, referred to as the "outflowing exhaust gas") does not contain unburned gas and $NO_X$, so the output air-fuel ratio of the downstream side air-fuel ratio sensor 41 becomes substantially the stoichiometric air-fuel ratio (in the present embodiment, 14.6).

When, after the time t0, the oxygen storage amount of the upstream side catalyst 20 approaches zero, the atmosphere of the upstream side catalyst 20 changes from the stoichiometric air-fuel ratio to rich. As a result, at the time t1, the output air-fuel ratio of the downstream side air-fuel ratio sensor 41 reaches the first rich judged air-fuel ratio AFrich1.

To make the oxygen storage amount of the upstream side catalyst 20 increase, at the time t1, the target air-fuel ratio is switched from the first rich set air-fuel ratio TAFrich1 to the first lean set air-fuel ratio TAFlean1. As a result, the air-fuel ratio of the inflowing exhaust gas becomes leaner than the stoichiometric air-fuel ratio, and the upstream side catalyst 20 stores the excess oxygen in the inflowing exhaust gas.

After the time t1, along with the increase of the oxygen storage amount of the upstream side catalyst 20, the atmosphere of the upstream side catalyst 20 changes from rich to the stoichiometric air-fuel ratio. Further, the output air-fuel ratio of the downstream side air-fuel ratio sensor 41 converges at the stoichiometric air-fuel ratio. Note that, before the output air-fuel ratio of the downstream side air-fuel ratio sensor 41 converges at the stoichiometric air-fuel ratio, the output air-fuel ratio of the downstream side air-fuel ratio sensor 41 will not reach the second rich judged air-fuel ratio AFrich2. In this case, almost no HC will flow out from the upstream side catalyst 20.

When, after that, the oxygen storage amount of the upstream side catalyst 20 approaches the maximum oxygen storage amount, the atmosphere of the upstream side catalyst 20 changes from the stoichiometric air-fuel rate to lean. As a result, at the time t2, the output air-fuel ratio of the downstream side air-fuel ratio sensor 41 reaches the first lean judged air-fuel ratio AFlean1.

To make the oxygen storage amount of the upstream side catalyst 20 decrease, at the time t2, the target air-fuel ratio is switched from the first lean set air-fuel ratio TAFlean1 to the first rich set air-fuel ratio TAFrich1. As a result, the air-fuel ratio of the inflowing exhaust gas becomes richer than the stoichiometric air-fuel ratio, and the upstream side catalyst 20 discharges the amount of oxygen corresponding to the amount insufficient for oxidizing the unburned gas.

After the time t2, along with the decrease of the oxygen storage amount of the upstream side catalyst 20, the atmosphere of the upstream side catalyst 20 changes from lean to the stoichiometric air-fuel ratio. Further, the output air-fuel ratio of the downstream side air-fuel ratio sensor 41 converges at the stoichiometric air-fuel ratio. Note that, before the output air-fuel ratio of the downstream side air-fuel ratio sensor 41 converges at the stoichiometric air-fuel ratio, the output air-fuel ratio of the downstream side air-fuel ratio sensor 41 will not reach the second lean judged air-fuel ratio AFlean2. In this case, almost no $NO_X$ will flow out from the upstream side catalyst 20.

When, after that, the oxygen storage amount of the upstream side catalyst 20 approaches zero, the atmosphere of the upstream side catalyst 20 changes from the stoichiometric air-fuel ratio to rich. As a result, at the time t3, the output air-fuel ratio of the downstream side air-fuel ratio sensor 41 reaches the first rich judged air-fuel ratio AFrich1.

To make the oxygen storage amount of the upstream side catalyst 20 increase, at the time t3, the target air-fuel ratio is switched from the first rich set air-fuel ratio TAFrich1 to the first lean set air-fuel ratio TAFlean1. However, due to the effect of an external disturbance, the air-fuel ratio of the inflowing exhaust gas deviates to the rich side from the target air-fuel ratio, and at the time t4, the output air-fuel ratio of the downstream side air-fuel ratio sensor 41 will reach the second rich judged air-fuel ratio AFrich2.

To keep HC from flowing out, at the time t4, the target air-fuel ratio is switched from the first lean set air-fuel ratio TAFlean1 to the second lean set air-fuel ratio TAFlean2. That is, the lean degree of the target air-fuel ratio is made larger. As a result, at the time t5, the output air-fuel ratio of the downstream side air-fuel ratio sensor 41 becomes a value at the stoichiometric air-fuel ratio side from the second rich judged air-fuel ratio AFrich2. That is, at the time t5, the output air-fuel ratio of the downstream side air-fuel ratio sensor 41 becomes leaner than the second rich judged air-fuel ratio AFrich2.

At the time t5, the target air-fuel ratio is switched from the second lean set air-fuel ratio TAFlean2 to the first lean set air-fuel ratio TAFlean1. That is, the lean degree of the target air-fuel ratio is made smaller. After the time t5, along with an increase of the oxygen storage amount of the upstream side catalyst 20, the atmosphere of the upstream side catalyst 20 changes from rich to the stoichiometric air-fuel ratio. Further, the output air-fuel ratio of the downstream side air-fuel ratio sensor 41 converges at the stoichiometric air-fuel ratio.

On the other hand, in the comparative example shown by the one-dot chain line, after the time t3, the target air-fuel ratio is maintained at the first lean set air-fuel ratio TAFlean1. In this case, after the time t3, the time period until the output air-fuel ratio of the downstream side air-fuel ratio sensor 41 converges at the stoichiometric air-fuel ratio becomes longer and a large amount of HC flows out from the upstream side catalyst 20. On the other hand, in the present embodiment, only a small amount of HC flows out from the upstream side catalyst 20. Therefore, according to the air-fuel ratio control in the present embodiment, it is possible to keep the exhaust emission from deteriorating if the air-fuel ratio of the inflowing exhaust gas fluctuates due to an external disturbance.

After that, in the present embodiment, if the oxygen storage amount of the upstream side catalyst 20 approaches the maximum oxygen storage amount, the atmosphere of the upstream side catalyst 20 changes from the stoichiometric air-fuel rate to lean. As a result, at the time t6, the output air-fuel ratio of the downstream side air-fuel ratio sensor 41 reaches the first lean judged air-fuel ratio AFlean1.

To make the oxygen storage amount of the upstream side catalyst 20 decrease, at the time t6, the target air-fuel ratio is switched from the first lean set air-fuel ratio TAFlean1 to the first rich set air-fuel ratio TAFrich1. However, due to the effect of external disturbance, the air-fuel ratio of the inflowing exhaust gas deviates to the lean side from the target air-fuel ratio. As a result, at the time t7, the output air-fuel ratio of the downstream side air-fuel ratio sensor 41 reaches the second lean judged air-fuel ratio AFlean2.

To keep the $NO_X$ from flowing out, at the time t7, the target air-fuel ratio is switched from the first rich set air-fuel ratio TAFrich1 to the second rich set air-fuel ratio TAFrich2. That is, the rich degree of the target air-fuel ratio is made larger. As a result, at the time t8, the output air-fuel ratio of the downstream side air-fuel ratio sensor 41 becomes a value at the stoichiometric air-fuel ratio side from the second lean judged air-fuel ratio AFlean2. That is, at the time t8, the output air-fuel ratio of the downstream side air-fuel ratio sensor 41 becomes richer than the second lean judged air-fuel ratio AFlean2.

At the time t8, the target air-fuel ratio is switched from the second rich set air-fuel ratio TAFrich2 to the first lean set air-fuel ratio TAFrich1. That is, the rich degree of the target air-fuel ratio is made smaller. After the time t8, along with the decrease of the oxygen storage amount of the upstream side catalyst 20, the atmosphere of the upstream side catalyst 20 changes from lean to the stoichiometric air-fuel ratio. Further, the output air-fuel ratio of the downstream side air-fuel ratio sensor 41 converges at the stoichiometric air-fuel ratio.

On the other hand, in the comparative example shown by the one-dot chain line, after the time t6, the target air-fuel ratio is maintained at the first rich set air-fuel ratio TAFrich1. In this case, after the time t6, the time period until the output air-fuel ratio of the downstream side air-fuel ratio sensor 41 converges at the stoichiometric air-fuel ratio becomes longer and a large amount of $NO_X$ flows out from the upstream side catalyst 20. On the other hand, in the present embodiment, only a small amount of $NO_X$ flows out from the upstream side catalyst 20. Therefore, according to the air-fuel ratio control in the present embodiment, it is possible to keep the exhaust emission from deteriorating if the air-fuel ratio of the inflowing exhaust gas fluctuates due to external disturbances.

Further, in the present embodiment, the lean degree of the target air-fuel ratio is made larger until the output air-fuel ratio of the downstream side air-fuel ratio sensor 41 becomes leaner than the second rich judged air-fuel ratio AFrich2 only in the case where the output air-fuel ratio of the downstream side air-fuel ratio sensor 41 reaches the second rich judged air-fuel ratio AFrich2. For this reason, it is possible to keep the time period during which the target air-fuel ratio is set to an air-fuel ratio leaner than the stoichiometric air-fuel ratio from becoming shorter. Therefore, it is possible to keep the time period during which the target air-fuel ratio is set to an air-fuel ratio richer than the stoichiometric air-fuel ratio from becoming relatively long compared with the time period during which the target air-fuel ratio is set to an air-fuel ratio leaner than the stoichiometric air-fuel ratio. For this reason, during operation of the internal combustion engine, it is possible to keep the time period during which the target air-fuel ratio is set to an air-fuel ratio richer than the stoichiometric air-fuel ratio from becoming longer and in turn possible to keep the fuel efficiency of the internal combustion engine from deteriorating.

Further, in the present embodiment, the rich degree of the target air-fuel ratio is made larger until the output air-fuel ratio of the downstream side air-fuel ratio sensor 41 becomes richer than the second lean judged air-fuel ratio AFlean2 only in the case where the output air-fuel ratio of the downstream side air-fuel ratio sensor 41 has reached the second lean judged air-fuel ratio AFlean2. For this reason, it is possible to shorten the time period during which the ratio of the fuel injection amount to the intake air amount is extremely large and in turn possible to keep the fuel efficiency of the internal combustion engine from deteriorating.

Further, in the example of FIG. 5, the target air-fuel ratio is switched from the first lean set air-fuel ratio TAFlean1 to the second lean set air-fuel ratio TAFlean2 when the output air-fuel ratio of the downstream side air-fuel ratio sensor 41 reaches the second rich judged air-fuel ratio AFrich2. However, if the output air-fuel ratio of the downstream side air-fuel ratio sensor 41 rapidly changes from the stoichiometric air-fuel ratio to the second rich judged air-fuel ratio AFrich2, the target air-fuel ratio may be directly switched from the first rich set air-fuel ratio TAFrich1 to the second lean set air-fuel ratio TAFlean2.

Similarly, in the example of FIG. 5, the target air-fuel ratio is switched from the first rich set air-fuel ratio TAFrich1 to the second rich set air-fuel ratio TAFrich2 when the output air-fuel ratio of the downstream side air-fuel ratio sensor 41 reaches the second lean judged air-fuel ratio AFlean2. However, if the output air-fuel ratio of the downstream side air-fuel ratio sensor 41 rapidly changes from the stoichiometric air-fuel ratio to the second lean judged air-fuel ratio AFlean2, the target air-fuel ratio may be directly switched from the first lean set air-fuel ratio TAFlean1 to the second rich set air-fuel ratio TAFrich2.

<Block Diagram of Control>

Figure 6:
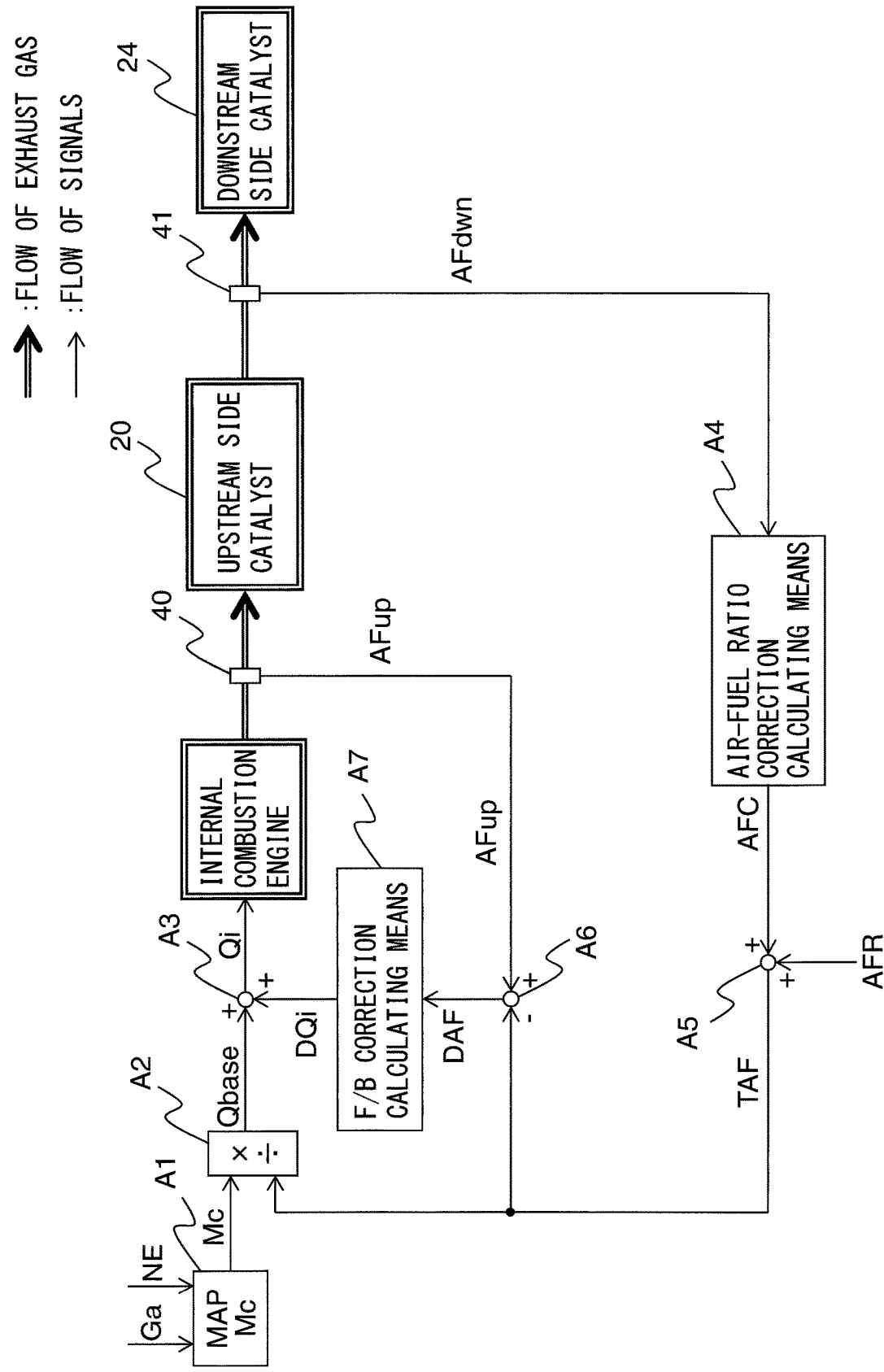
FIG. 6 is a block diagram of control of the air-fuel ratio control.

Below, referring to FIG. 6 and FIG. 7, the air-fuel ratio control in the present embodiment will be explained in detail. FIG. 6 is a block diagram of control for air-fuel ratio control. The air-fuel ratio control device includes the functional blocks A1 to A7. Below, the functional blocks will be explained.

First, the calculation of the fuel injection amount will be explained. To calculate the fuel injection amount, the cylinder intake air calculating means A1, the basic fuel injection calculating means A2, and the fuel injection calculating means A3 are used.

The cylinder intake air calculating means A1 uses a map or calculation formula stored in the ROM 34 of the ECU 31 to calculate the intake air amount Mc to the cylinders based on the intake air amount Ga and the engine speed NE. The intake air amount Ga is detected by the air flow meter 39, while the engine speed NE is calculated based on the output of the crank angle sensor 44.

The basic fuel injection calculating means A2 divides the cylinder intake air amount Mc calculated by the cylinder intake air calculating means A1 by the target air-fuel ratio TAF to calculate the basic fuel injection amount Qbase (Qbase=Mc/TAF). The target air-fuel ratio TAF is calculated by the later explained target air-fuel ratio setting means A5.

The fuel injection calculating means A3 adds the basic fuel injection amount Qbase calculated by the basic fuel injection calculating means A2 and the later explained F/B correction amount DQi to calculate the fuel injection amount Qi (Qi=Qbase+DQi). An instruction for injection is given to the fuel injectors 11 so that fuel of the fuel injection amount Qi calculated in this way is injected from the fuel injectors 11.

Next, calculation of the target air-fuel ratio will be explained. For calculation of the target air-fuel ratio, the air-fuel ratio correction calculating means A4 and target air-fuel ratio setting means A5 are used.

In the air-fuel ratio correction calculating means A4, the air-fuel ratio correction amount AFC of the target air-fuel ratio is calculated based on the output air-fuel ratio AFdwn of the downstream side air-fuel ratio sensor 41. The target air-fuel ratio setting means A5 adds the air-fuel ratio correction amount AFC calculated by the air-fuel ratio correction calculating means A4 to the control center air-fuel ratio AFR (in the present embodiment, the stoichiometric air-fuel ratio) to calculate the target air-fuel ratio TAF. The thus calculated target air-fuel ratio TAF is input to the basic fuel injection calculating means A2 and later explained air-fuel ratio deviation calculating means A6.

Next, the calculation of the F/B correction amount based on the output air-fuel ratio AFup of the upstream side air-fuel ratio sensor 40 will be explained. To calculate the F/B correction amount, the air-fuel ratio deviation calculating means A6 and F/B correction calculating means A7 are used.

The air-fuel ratio deviation calculating means A6 subtracts the target air-fuel ratio TAF calculated by the target air-fuel ratio setting means A5 from the output air-fuel ratio AFup of the upstream side air-fuel ratio sensor 40 to calculate the deviation of air-fuel ratio DAF (DAF=AFup−TAF). This deviation of air-fuel ratio DAF is a value indicating the excess/deficiency of the amount of supply of fuel with respect to the target air-fuel ratio TAF.

The F/B correction calculating means A7 processes the deviation of air-fuel ratio DAF calculated by the air-fuel ratio deviation calculating means A6 by proportional integral differential processing (PID processing) to calculate the F/B correction amount DQi for compensating for the excess or deficiency of the amount of supply of fuel based on the following formula (1). The thus calculated F/B correction amount DQi is input to the fuel injection calculating means A3.

$$DQi = Kp \cdot DAF + Ki \cdot SDAF + Kd \cdot DDAF \quad (1)$$

In the above formula (1), Kp is a preset proportional gain (proportional constant), Ki is the preset integral gain (integral constant), and Kd is the preset differential gain (differential constant). Further, DDAF is the time differential of the deviation of air-fuel ratio DAF and is calculated by dividing the deviation between the currently updated deviation of air-fuel ratio DAF and the previous deviation of air-fuel ratio DAF by the time corresponding to the updating interval. Further, SDAF is the time integral of the deviation of air-fuel ratio DAF and is calculated by adding the currently updated deviation of air-fuel ratio DAF to the previous time integral SDAF.

Note that, if feedback control based on the output of the upstream side air-fuel ratio sensor 40 is not performed, the air-fuel ratio deviation calculating means A6 and F/B correction calculating means A7 are not used for the air-fuel ratio control. In this case, the air-fuel ratio deviation calculating means A6 and F/B correction calculating means A7 are deleted from the block diagram of control shown in FIG. 6.

<Processing for Setting Target Air-Fuel Ratio>

Figure 7:
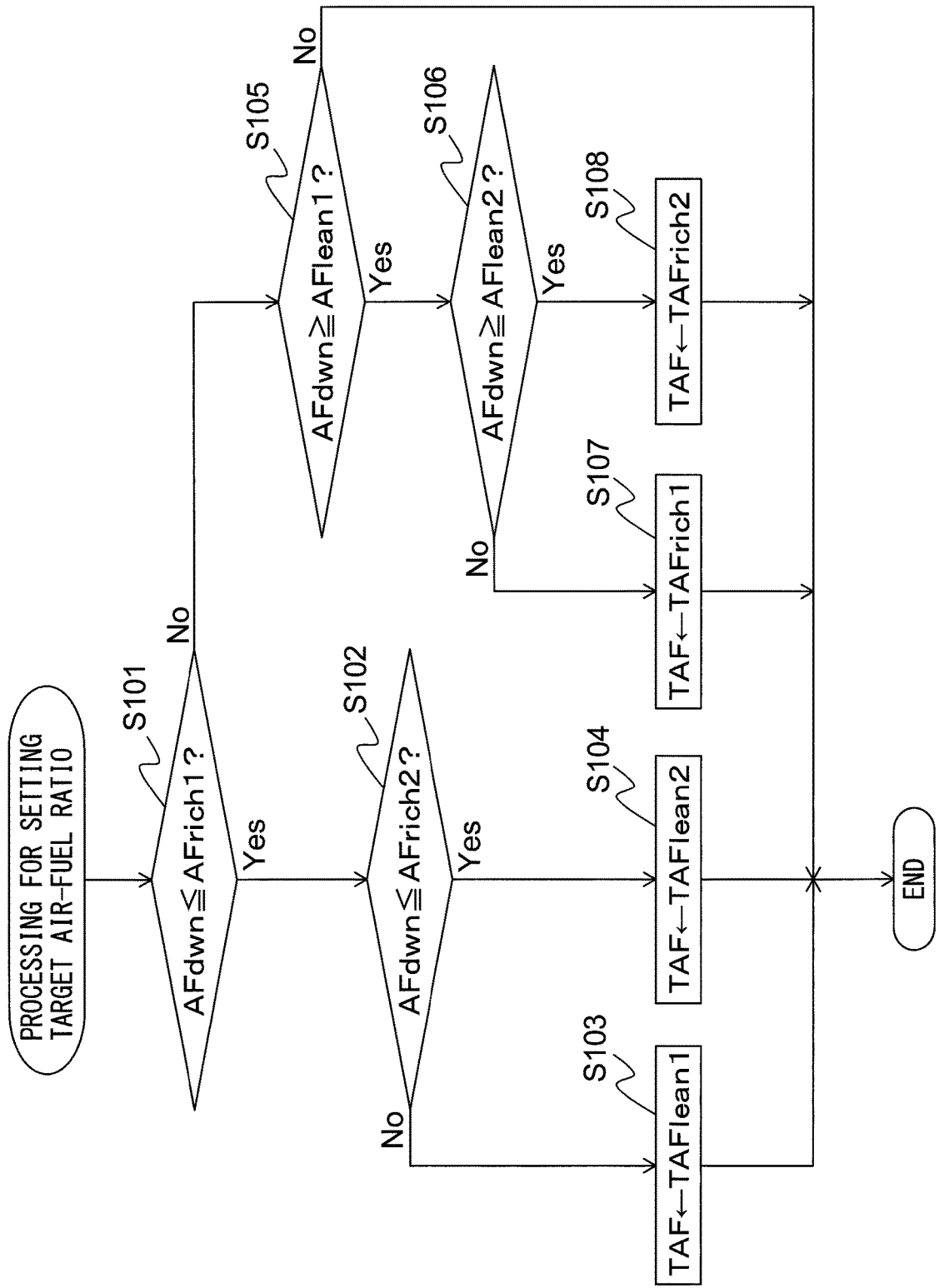
FIG. 7 is a flow chart showing a control routine of processing for setting a target air-fuel ratio in the first embodiment.

FIG. 7 is a flow chart showing a control routine for processing for setting the target air-fuel ratio in the first embodiment. The control routine is repeatedly performed at predetermined time intervals by the ECU 31 after startup of the internal combustion engine.

First, at step S101, it is judged whether the output air-fuel ratio AFdwn of the downstream side air-fuel ratio sensor 41 is the first rich judged air-fuel ratio AFrich1 or less. If it is judged that the output air-fuel ratio AFdwn of the downstream side air-fuel ratio sensor 41 is the first rich judged air-fuel ratio AFrich1 or less, the present control routine proceeds to step S102. In this case, it is judged that the atmosphere of the upstream side catalyst 20 is rich.

At step S102, it is judged whether the output air-fuel ratio AFdwn of the downstream side air-fuel ratio sensor 41 is the second rich judged air-fuel ratio AFrich2 or less. If it is judged that the output air-fuel ratio AFdwn of the downstream side air-fuel ratio sensor 41 is higher than the second rich judged air-fuel ratio AFrich2, the present control routine proceeds to step S103. At step S103, the target air-fuel ratio TAF is set to the first lean set air-fuel ratio TAFlean1. Note that, if the current target air-fuel ratio TAF is the first lean set air-fuel ratio TAFlean1, the target air-fuel ratio TAF is maintained at the first lean set air-fuel ratio TAFlean1. After step S103, the present control routine ends.

On the other hand, if at step S102 it is judged that the output air-fuel ratio AFdwn of the downstream side air-fuel ratio sensor 41 is the second rich judged air-fuel ratio AFrich2 or less, the present control routine proceeds to step S104. At step S104, the target air-fuel ratio TAF is set to the second lean set air-fuel ratio TAFlean2. Note that, if the current target air-fuel ratio TAF is the second lean set air-fuel ratio TAFlean2, the target air-fuel ratio TAF is maintained at the second lean set air-fuel ratio TAFlean2. After step S104, the present control routine ends.

Further, if at step S101 it is judged that the output air-fuel ratio AFdwn of the downstream side air-fuel ratio sensor 41 is higher than the first rich judged air-fuel ratio AFrich1, the present control routine proceeds to step S105. At step S105, it is judged whether the output air-fuel ratio AFdwn of the downstream side air-fuel ratio sensor 41 is the first lean judged air-fuel ratio AFlean1 or more. If it is judged that the output air-fuel ratio AFdwn of the downstream side air-fuel ratio sensor 41 is the first lean judged air-fuel ratio AFlean1 or more, the present control routine proceeds to step S106. In this case, it is judged that the atmosphere of the upstream side catalyst 20 is lean.

At step S106, it is judged whether the output air-fuel ratio AFdwn of the downstream side air-fuel ratio sensor 41 is the second lean judged air-fuel ratio AFlean2 or more. If it is judged that the output air-fuel ratio AFdwn of the downstream side air-fuel ratio sensor 41 is lower than the second lean judged air-fuel ratio AFlean2, the present control routine proceeds to step S107. At step S107, the target air-fuel ratio TAF is set to the first rich set air-fuel ratio TAFrich1. Note that, if the current target air-fuel ratio TAF is the first rich set air-fuel ratio TAFrich1, the target air-fuel ratio TAF is maintained at the first rich set air-fuel ratio TAFrich1. After step S107, the present control routine ends.

On the other hand, if at step S106 it is judged that the output air-fuel ratio AFdwn of the downstream side air-fuel ratio sensor 41 is the second lean judged air-fuel ratio AFlean2 or more, the present control routine proceeds to step S108. At step S108, the target air-fuel ratio TAF is set to the second rich set air-fuel ratio TAFrich2. Note that, if the current target air-fuel ratio TAF is the second rich set air-fuel ratio TAFrich2, the target air-fuel ratio TAF is maintained at the second rich set air-fuel ratio TAFrich2. After step S108, the present control routine ends.

Further, if at step S105 it is judged that the output air-fuel ratio AFdwn of the downstream side air-fuel ratio sensor 41 is lower than the first lean judged air-fuel ratio AFlean1, the present control routine ends. In this case, it is judged that the atmosphere of the upstream side catalyst 20 is the stoichiometric air-fuel ratio, and the target air-fuel ratio TAF is maintained at the currently set value.

Second Embodiment

The constitution and control of the exhaust purification system of an internal combustion engine in the second embodiment are basically similar to the exhaust purification system of an internal combustion engine in the first embodiment except for the points explained below. For this reason, below, the second embodiment of the present invention will be explained centered on the parts different from the first embodiment.

In the second embodiment, the air-fuel ratio control device switches the target air-fuel ratio from the rich set air-fuel ratio to the first lean set air-fuel ratio when the output air-fuel ratio of the downstream side air-fuel ratio sensor 41 reaches the first rich judged air-fuel ratio. Further, the air-fuel ratio control device switches the target air-fuel ratio from the first lean set air-fuel ratio to the rich set air-fuel ratio when judging that the amount of change of the oxygen storage amount of the upstream side catalyst 20 at the time when the target air-fuel ratio is maintained at an air-fuel ratio leaner than the stoichiometric air-fuel ratio has reached the reference amount.

The rich set air-fuel ratio and first rich judged air-fuel ratio are preset and are air-fuel ratios richer than the stoichiometric air-fuel ratio (in the present embodiment, 14.6). Further, the rich set air-fuel ratio is richer than the first rich judged air-fuel ratio. That is, the rich degree of the rich set air-fuel ratio is greater than the rich degree of the first rich judged air-fuel ratio. Further, the first rich judged air-fuel ratio is set to an air-fuel ratio corresponding to the output of the downstream side air-fuel ratio sensor 41 when the oxygen storage amount of the upstream side catalyst 20 decreases and the atmosphere of the upstream side catalyst 20 changes from the stoichiometric air-fuel ratio to rich.

The first lean set air-fuel ratio is preset and is an air-fuel ratio leaner than the stoichiometric air-fuel ratio. Further, the reference amount is preset and is set to a value smaller than the maximum oxygen storage amount of the upstream side catalyst 20. Further, the air-fuel ratio control device cumulatively adds the oxygen excess/deficiency with respect to the stoichiometric air-fuel ratio of the inflowing exhaust gas to calculate the amount of change of the oxygen storage amount of the upstream side catalyst 20.

Note that, the oxygen excess/deficiency with respect to the stoichiometric air-fuel ratio of the inflowing exhaust gas means the amount of oxygen becoming in excess or the amount of oxygen deficient when trying to make the air-fuel ratio of the inflowing exhaust gas the stoichiometric air-fuel ratio. When the target air-fuel ratio is maintained at an air-fuel ratio leaner than the stoichiometric air-fuel ratio, oxygen is stored in the upstream side catalyst 20, so the value of the oxygen excess/deficiency becomes positive. For this reason, the air-fuel ratio control device calculates the amount of change of the oxygen storage amount of the upstream side catalyst 20 as the cumulative value of the oxygen excess/deficiency with respect to the stoichiometric air-fuel ratio of the inflowing exhaust gas.

The oxygen excess/deficiency OED is, for example, calculated based on the output of the upstream side air-fuel ratio sensor 40 and the fuel injection amount by the following formula (2).

$$OED = 0.23 \times (AFup - 14.6) \times Qi \qquad (2)$$

where, 0.23 is the concentration of oxygen in the air, 14.6 is the stoichiometric air-fuel ratio, Qi is the fuel injection amount, and AFup is the output air-fuel ratio of the upstream side air-fuel ratio sensor 40.

Note that, the oxygen excess/deficiency OED may be calculated based on the output of the upstream side air-fuel ratio sensor 40 and the intake air amount by the following formula (3):

$$OED = 0.23 \times (AFup - 14.6) \times Ga/AFup \qquad (3)$$

where, 0.23 is the concentration of oxygen in the air, 14.6 is the stoichiometric air-fuel ratio, Ga is the intake air amount, and AFup is the output air-fuel ratio of the upstream side air-fuel ratio sensor 40. The intake air amount Ga is detected by the air flow meter 39.

Further, the oxygen excess/deficiency OED may be calculated based on the target air-fuel ratio of the inflowing exhaust gas without using the output of the upstream side air-fuel ratio sensor 40. In this case, in the above formulas (2) and (3), the value of the target air-fuel ratio is used instead of the output air-fuel ratio AFup of the upstream side air-fuel ratio sensor 40.

Further, when the output air-fuel ratio of the downstream side air-fuel ratio sensor 41 is near the first rich judged air-fuel ratio, the oxygen storage amount of the upstream side catalyst 20 is close to zero. For this reason, if the air-fuel ratio of the inflowing exhaust gas deviates from the target air-fuel ratio to the rich side when the output air-fuel ratio of the downstream side air-fuel ratio sensor 41 is near the first rich judged air-fuel ratio, a large amount of unburned gas is liable to flow out from the upstream side catalyst 20. In this case, to suppress the outflow of unburned gas, it is necessary to increase the lean degree of the air-fuel ratio of the inflowing exhaust gas.

For this reason, in the present embodiment, if the output air-fuel ratio of the downstream side air-fuel ratio sensor 41 reaches the second rich judged air-fuel ratio, the air-fuel ratio control device sets the target air-fuel ratio to the second lean set air-fuel ratio when the output air-fuel ratio of the downstream side air-fuel ratio sensor 41 reaches the second rich judged air-fuel ratio and switches the target air-fuel ratio from the second lean set air-fuel ratio to the first lean set air-fuel ratio when the output air-fuel ratio of the downstream side air-fuel ratio sensor 41 becomes a value at the stoichiometric air-fuel ratio side from the second rich judged air-fuel ratio. In other words, if the output air-fuel ratio of the downstream side air-fuel ratio sensor 41 reaches the second rich judged air-fuel ratio, the air-fuel ratio control device maintains the target air-fuel ratio at the second lean set air-fuel ratio from when the output air-fuel ratio of the downstream side air-fuel ratio sensor 41 reaches the second rich judged air-fuel ratio until it becomes a value at the stoichiometric air-fuel ratio side from the second rich judged air-fuel ratio.

The second rich judged air-fuel ratio is preset and is an air-fuel ratio richer than the stoichiometric air-fuel ratio. Further, the second rich judged air-fuel ratio is richer than the first rich judged air-fuel ratio. That is, the rich degree of the second rich judged air-fuel ratio is greater than the rich degree of the first rich judged air-fuel ratio. Further, the second rich judged air-fuel ratio is set to an air-fuel ratio corresponding to the output of the downstream side air-fuel ratio sensor 41 when a predetermined amount of unburned gas flows out from the upstream side catalyst 20.

The second lean set air-fuel ratio is preset and is an air-fuel ratio leaner than the stoichiometric air-fuel ratio. Further, the second lean set air-fuel ratio is leaner than the first lean set air-fuel ratio. That is, the lean degree of the second lean set air-fuel ratio is larger than the lean degree of the first lean set air-fuel ratio.

<Explanation of Air-Fuel Ratio Control Using Time Chart>

Figure 8:
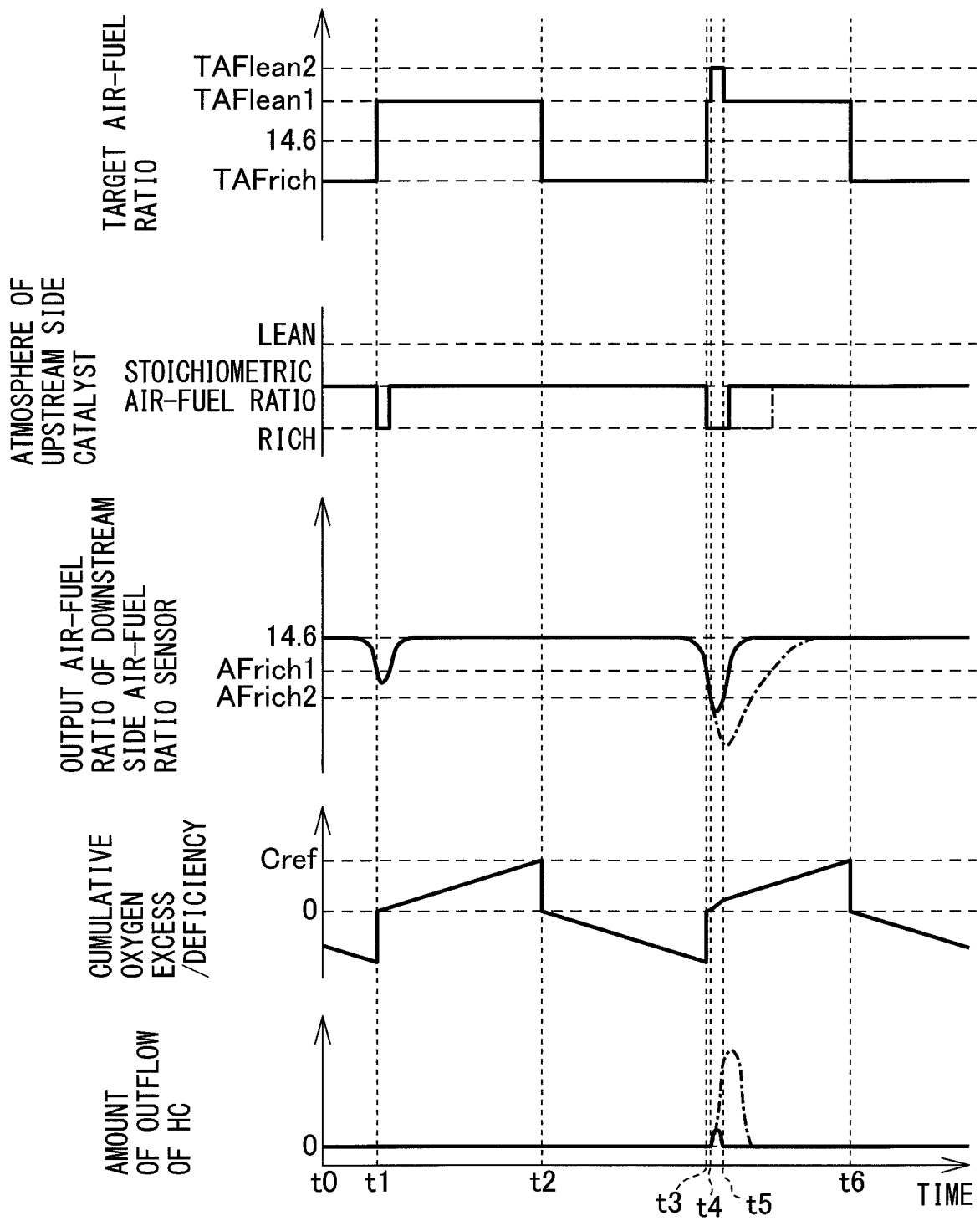
FIG. 8 is a time chart showing a target air-fuel ratio etc., of inflowing exhaust gas when the air-fuel ratio control in a second embodiment is performed.

Referring to FIG. 8, the air-fuel ratio control in the second embodiment will be explained specifically. FIG. 8 is a time chart of parameters during which air-fuel ratio control in the second embodiment is performed such as the target air-fuel ratio of the inflowing exhaust gas, the atmosphere of the upstream side catalyst 20, the output air-fuel ratio of the downstream side air-fuel ratio sensor 41, the cumulative value of the oxygen excess/deficiency with respect to the stoichiometric air-fuel ratio of the inflowing exhaust gas (cumulative oxygen excess/deficiency), and the amount of HC flowing out from the upstream side catalyst 20. The cumulative value of the oxygen excess/deficiency is calculated by cumulatively adding the oxygen excess/deficiency calculated by the above formula (2) or (3). In FIG. 8, the solid line shows the time chart in the second embodiment, while the one-dot chain line shows the time chart in the comparative example of the second embodiment.

In the illustrated example, at the time t0, the target air-fuel ratio is set to the rich set air-fuel ratio TAFrich, and the air-fuel ratio of the inflowing exhaust gas becomes richer than the stoichiometric air-fuel ratio. For this reason, the upstream side catalyst 20 discharges the amount of oxygen corresponding to the amount insufficient for oxidizing the unburned gas. At the time to, the oxygen storage amount of the upstream side catalyst 20 is sufficient, and the atmosphere of the upstream side catalyst 20 is the stoichiometric air-fuel ratio. In this case, due to the purification action at the upstream side catalyst 20, the outflowing exhaust gas does not include unburned gas and $NO_X$, so the output air-fuel ratio of the downstream side air-fuel ratio sensor 41 becomes substantially the stoichiometric air-fuel ratio.

After the time t0, the cumulative oxygen excess/deficiency gradually decreases. When the oxygen storage amount of the upstream side catalyst 20 approaches zero, the atmosphere of the upstream side catalyst 20 changes from the stoichiometric air-fuel ratio to rich. As a result, at the time t1, the output air-fuel ratio of the downstream side air-fuel ratio sensor 41 reaches the first rich judged air-fuel ratio AFrich1.

To make the oxygen storage amount of the upstream side catalyst 20 increase, at the time t1, the target air-fuel ratio is switched from the rich set air-fuel ratio TAFrich to the first lean set air-fuel ratio TAFlean1. As a result, the air-fuel ratio of the inflowing exhaust gas becomes leaner than the stoichiometric air-fuel ratio, and the upstream side catalyst 20 stores the excess oxygen in the inflowing exhaust gas. Further, at the time t1, the cumulative oxygen excess/deficiency is reset to zero.

After the time t1, the cumulative oxygen excess/deficiency gradually increases. At the time t2, it reaches the reference amount Cref. For this reason, to make the oxygen storage amount of the upstream side catalyst 20 decrease, at the time t2, the target air-fuel ratio is switched from the first lean set air-fuel ratio TAFlean1 to the rich set air-fuel ratio TAFrich. As a result, the air-fuel ratio of the inflowing exhaust gas becomes richer than the stoichiometric air-fuel ratio, and the upstream side catalyst 20 discharges the amount of oxygen corresponding to the amount insufficient for oxidizing the unburned gas.

After that, when the oxygen storage amount of the upstream side catalyst 20 approaches zero, the atmosphere of the upstream side catalyst 20 changes from the stoichiometric air-fuel ratio to rich. As a result, at the time t3, the output air-fuel ratio of the downstream side air-fuel ratio sensor 41 reaches the first rich judged air-fuel ratio AFrich1.

To make the oxygen storage amount of the upstream side catalyst 20 increase, at the time t3, the target air-fuel ratio is switched from the rich set air-fuel ratio TAFrich to the first lean set air-fuel ratio TAFlean1. However, due to the effect of external disturbance, the air-fuel ratio of the inflowing exhaust gas deviates to the rich side from the target air-fuel ratio. As a result, at the time t4, the output air-fuel ratio of the downstream side air-fuel ratio sensor 41 reaches the second rich judged air-fuel ratio AFrich2.

To keep HC from flowing out, at the time t4, the target air-fuel ratio is switched from the first lean set air-fuel ratio TAFlean1 to the second lean set air-fuel ratio TAFlean2. That is, the lean degree of the target air-fuel ratio is made larger. As a result, at the time t5, the output air-fuel ratio of the downstream side air-fuel ratio sensor 41 becomes a value at the stoichiometric air-fuel ratio side from the second rich judged air-fuel ratio AFrich2. That is, at the time t5, the output air-fuel ratio of the downstream side air-fuel ratio sensor 41 becomes leaner than the second rich judged air-fuel ratio AFrich2.

At the time t5, the target air-fuel ratio is switched from the second lean set air-fuel ratio TAFlean2 to the first lean set air-fuel ratio TAFlean1. That is, the lean degree of the target air-fuel ratio is made smaller. After the time t5, along with the increase of the oxygen storage amount of the upstream side catalyst 20, the atmosphere of the upstream side catalyst 20 changes from rich to the stoichiometric air-fuel ratio. Further, the output air-fuel ratio of the downstream side air-fuel ratio sensor 41 converges at the stoichiometric air-fuel ratio.

On the other hand, in the comparative example shown by the one-dot chain line, after the time t3, the target air-fuel ratio is maintained at the first lean set air-fuel ratio TAFlean1. In this case, after the time t3, the time period until the output air-fuel ratio of the downstream side air-fuel ratio sensor 41 converges to the stoichiometric air-fuel ratio becomes longer and a large amount of HC flows out from the upstream side catalyst 20. On the other hand, in the second embodiment, only a small amount of HC flows out from the upstream side catalyst 20. Therefore, according to the air-fuel ratio control in the second embodiment, it is possible to keep the exhaust emission from deteriorating if the air-fuel ratio of the inflowing exhaust gas fluctuates due to external disturbance.

After that, in the second embodiment, the cumulative oxygen excess/deficiency gradually increases. At the time t6, it reaches the reference amount Cref. For this reason, to make the oxygen storage amount of the upstream side catalyst 20 decrease, at the time t6, the target air-fuel ratio is switched from the first lean set air-fuel ratio TAFlean1 to the rich set air-fuel ratio TAFrich.

In the second embodiment, the lean degree of the target air-fuel ratio is made larger until the output air-fuel ratio of the downstream side air-fuel ratio sensor 41 becomes leaner than the second rich judged air-fuel ratio AFrich2 only if the output air-fuel ratio of the downstream side air-fuel ratio sensor 41 reaches the second rich judged air-fuel ratio AFrich2. For this reason, the time period during which the target air-fuel ratio is set to an air-fuel ratio leaner than the stoichiometric air-fuel ratio can be kept from becoming shorter. Therefore, the time period during which the target air-fuel ratio is set to an air-fuel ratio richer than the stoichiometric air-fuel ratio can be kept from becoming longer compared with the time period during which the target air-fuel ratio is set to an air-fuel ratio leaner than the stoichiometric air-fuel ratio. For this reason, during operation of the internal combustion engine, it is possible to keep the time period during which the target air-fuel ratio is set to an air-fuel ratio richer than the stoichiometric air-fuel ratio from becoming longer and in turn possible to keep the fuel efficiency of the internal combustion engine from deteriorating.

In the example of FIG. 8, when the output air-fuel ratio of the downstream side air-fuel ratio sensor 41 reaches the second rich judged air-fuel ratio AFrich2, the target air-fuel ratio is switched from the first lean set air-fuel ratio TAFlean1 to the second lean set air-fuel ratio TAFlean2. However, if the output air-fuel ratio of the downstream side air-fuel ratio sensor 41 rapidly changes from the stoichiometric air-fuel ratio to the second rich judged air-fuel ratio AFrich2, the target air-fuel ratio may be directly switched from the rich set air-fuel ratio TAFrich to the second lean set air-fuel ratio TAFlean2.

<Block Diagram of Control>

Figure 9:
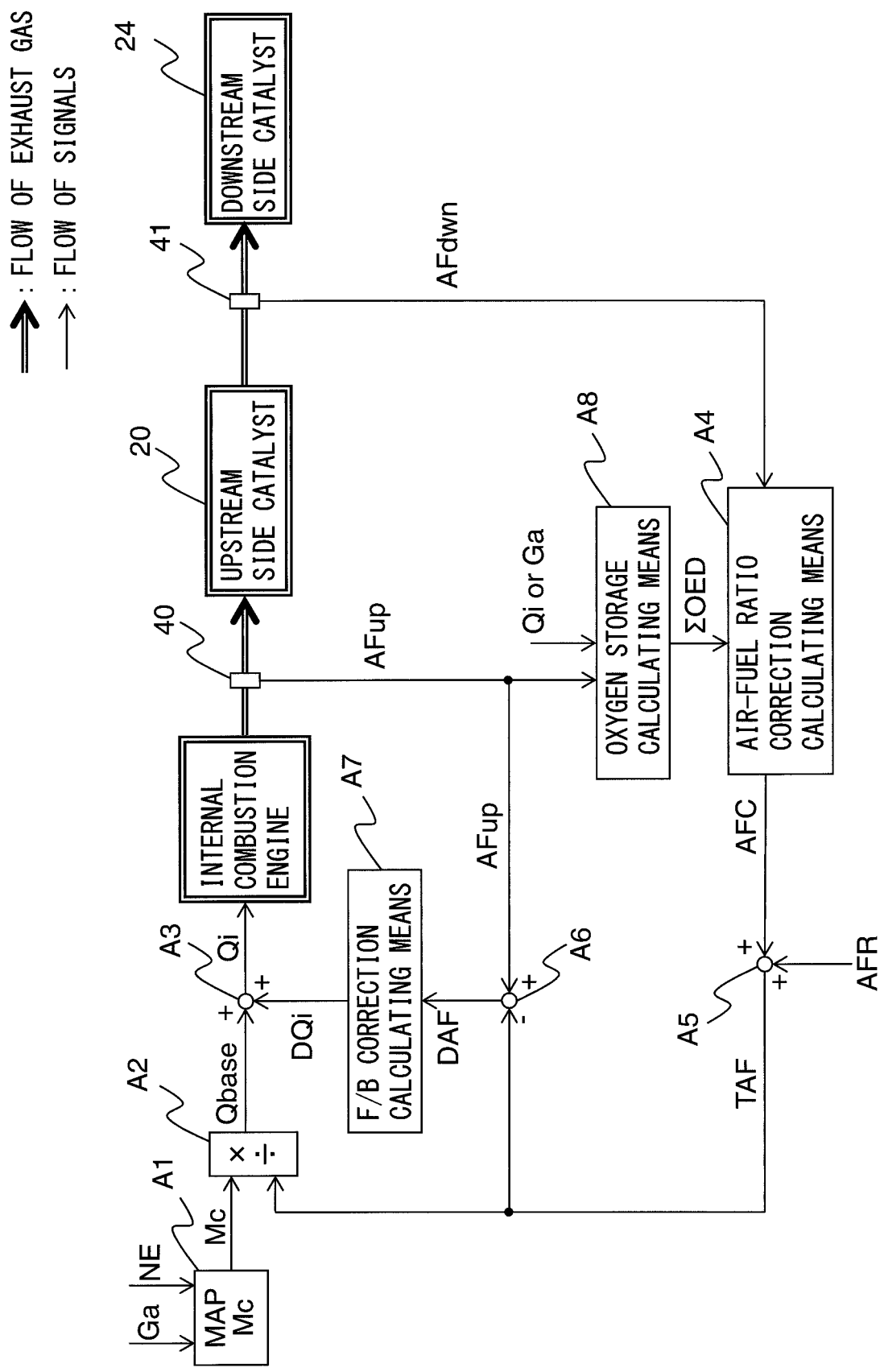
FIG. 9 is a block diagram of control of the air-fuel ratio control.

Below, referring to FIG. 9 and FIG. 10, the air-fuel ratio control in the second embodiment will be explained in detail. FIG. 9 is a block diagram of control of the air-fuel ratio control. The air-fuel ratio control device includes the functional blocks A1 to A8. The functional blocks A1 to 7 in FIG. 9 are similar to the functional blocks A1 to A7 in FIG. 6.

In the second embodiment, to calculate the target air-fuel ratio, in addition to the air-fuel ratio correction calculating means A4 and target air-fuel ratio setting means A5, an oxygen storage calculating means A8 is used. The oxygen storage calculating means A8 calculates the oxygen excess/deficiency by the above formula (2) or (3) based on the output air-fuel ratio AFup of the upstream side air-fuel ratio sensor 40 and the fuel injection amount Qi calculated by the fuel injection calculating means A3 or the intake air amount Ga. Further, the oxygen storage calculating means A8 cumulatively adds the oxygen excess/deficiency to calculate the cumulative oxygen excess/deficiency ΣOED.

In the air-fuel ratio correction calculating means A4, the air-fuel ratio correction amount AFC of the target air-fuel ratio is calculated based on the cumulative oxygen excess/deficiency ΣOED calculated by the oxygen storage calculating means A8 and the output air-fuel ratio AFdwn of the downstream side air-fuel ratio sensor 41.

Note that, if feedback control based on the output of the upstream side air-fuel ratio sensor 40 is not performed, the air-fuel ratio deviation calculating means A6 and F/B correction calculating means A7 are not used for the air-fuel ratio control. In this case, the air-fuel ratio deviation calculating means A6 and F/B correction calculating means A7 are deleted from the block diagram of control shown in FIG. 9. Further, if the oxygen excess/deficiency is calculated based on the target air-fuel ratio of the inflowing exhaust gas instead of the output of the upstream side air-fuel ratio sensor 40, the target air-fuel ratio TAF is input to the oxygen storage calculating means A8 instead of the output air-fuel ratio AFup of the upstream side air-fuel ratio sensor 40.

<Processing for Setting Target Air-Fuel Ratio>

Figure 10:
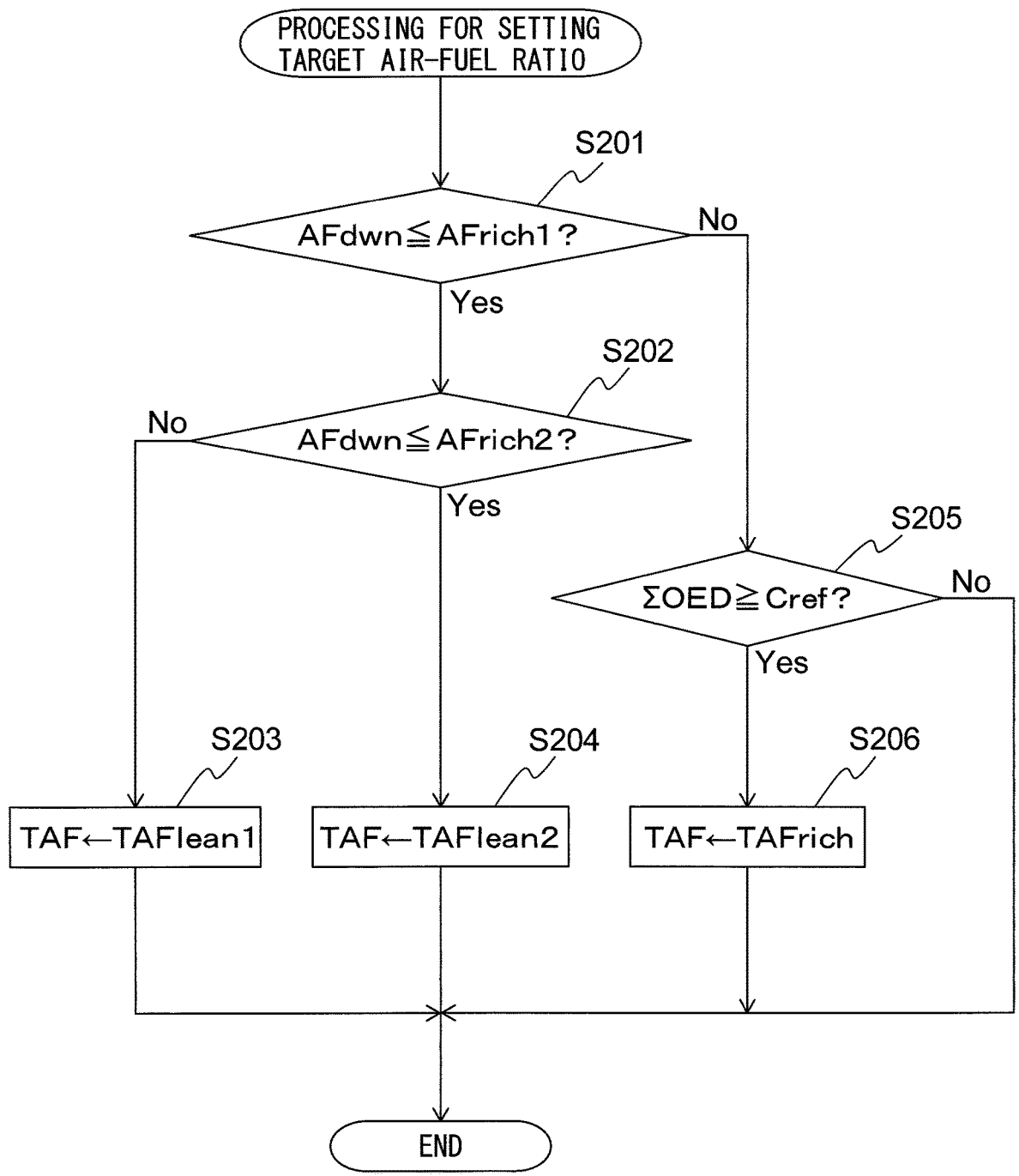
FIG. 10 is a flow chart showing a control routine of processing for setting a target air-fuel ratio in the second embodiment.

FIG. 10 is a flow chart showing a control routine of processing for setting the target air-fuel ratio in the second embodiment. The control routine is repeatedly performed at predetermined time intervals by the ECU 31 after startup of the internal combustion engine.

First, at step S201, it is judged whether the output air-fuel ratio AFdwn of the downstream side air-fuel ratio sensor 41 is the first rich judged air-fuel ratio AFrich1 or less. If it is judged that the output air-fuel ratio AFdwn of the downstream side air-fuel ratio sensor 41 is the first rich judged air-fuel ratio AFrich1 or less, the present control routine proceeds to step S202.

At step S202, it is judged whether the output air-fuel ratio AFdwn of the downstream side air-fuel ratio sensor 41 is the second rich judged air-fuel ratio AFrich2 or less. If it is judged that the output air-fuel ratio AFdwn of the downstream side air-fuel ratio sensor 41 is higher than the second rich judged air-fuel ratio AFrich2, the present control routine proceeds to step S203. At step S203, the target air-fuel ratio TAF is set to the first lean set air-fuel ratio TAFlean1. Note that, if the current target air-fuel ratio TAF is the first lean set air-fuel ratio TAFlean1, the target air-fuel ratio TAF is maintained at the first lean set air-fuel ratio TAFlean1. After step S203, the present control routine ends.

On the other hand, if at step S202 it is judged that the output air-fuel ratio AFdwn of the downstream side air-fuel ratio sensor 41 is the second rich judged air-fuel ratio AFrich2 or less, the present control routine proceeds to step S204. At step S204, the target air-fuel ratio TAF is set to the second lean set air-fuel ratio TAFlean2. Note that, if the current target air-fuel ratio TAF is the second lean set air-fuel ratio TAFlean2, the target air-fuel ratio TAF is maintained at the second lean set air-fuel ratio TAFlean2. After step S204, the present control routine ends.

Further, if at step S201 it is judged that the output air-fuel ratio AFdwn of the downstream side air-fuel ratio sensor 41 is higher than the first rich judged air-fuel ratio AFrich1, the present control routine proceeds to step S205. At step S205, it is judged whether the cumulative oxygen excess/deficiency ΣOED is the reference amount Cref or more.

The reference amount Cref, for example, is set to a value of 0.2 to 0.8 time the maximum oxygen storage amount of the upstream side catalyst 20 in the unused state. Note that, the reference amount Cref may be set to 0.2 to 0.8 time the maximum oxygen storage amount of the upstream side catalyst 20 calculated by a known means.

The cumulative oxygen excess/deficiency ΣOED is calculated by cumulatively adding the oxygen excess/deficiency OED calculated by the above formula (2) or (3). Further, the cumulative oxygen excess/deficiency ΣOED is reset to zero when the target air-fuel ratio TAF is switched from the rich set air-fuel ratio TAFrich to the first lean set air-fuel ratio TAFlean1 and when the target air-fuel ratio TAF is switched from the first lean set air-fuel ratio TAFlean1 to the rich set air-fuel ratio TAFrich. Note that, if the target air-fuel ratio TAF is directly switched from the rich set air-fuel ratio TAFrich to the second lean set air-fuel ratio TAFlean2, the cumulative oxygen excess/deficiency ΣOED is reset to zero when the target air-fuel ratio TAF is switched from the rich set air-fuel ratio TAFrich to the second lean set air-fuel ratio TAFlean2.

If at step S205 it is judged that the cumulative oxygen excess/deficiency ΣOED is the reference amount Cref or more, the present control routine proceeds to step S206. At step S206, the target air-fuel ratio TAF is set to the rich set air-fuel ratio TAFrich. Note that, if the current target air-fuel ratio TAF is the rich set air-fuel ratio TAFrich, the target air-fuel ratio TAF is maintained at the rich set air-fuel ratio TAFrich. After step S206, the present control routine ends.

On the other hand, if at step S205 it is judged that the cumulative oxygen excess/deficiency ΣOED is less than the reference amount Cref, the present control routine ends. In this case, the target air-fuel ratio TAF is maintained at the currently set value.

Third Embodiment

The constitution and control of the exhaust purification system of an internal combustion engine in the third embodiment are basically similar to the exhaust purification system of an internal combustion engine in the first embodiment except for the points explained below. For this reason, below, the third embodiment of the present invention will be explained centered on the parts different from the first embodiment.

In the third embodiment, the air-fuel ratio control device switches the target air-fuel ratio from the lean set air-fuel ratio to the first rich set air-fuel ratio when the output air-fuel ratio of the downstream side air-fuel ratio sensor 41 reaches the first lean judged air-fuel ratio. Further, the air-fuel ratio control device switches the target air-fuel ratio from the first rich set air-fuel rate to the lean set air-fuel ratio when judging that the amount of change of the oxygen storage amount of the upstream side catalyst 20 when the target air-fuel ratio is maintained at an air-fuel ratio richer than the stoichiometric air-fuel ratio reaches a reference amount.

The lean set air-fuel ratio and first lean judged air-fuel ratio are preset and are air-fuel ratios leaner than the stoichiometric air-fuel ratio (in the present embodiment, 14.6). Further, the lean set air-fuel ratio is leaner than the first lean judged air-fuel ratio. That is, the lean degree of the lean set air-fuel ratio is larger than the lean degree of the first lean judged air-fuel ratio. Further, the first lean judged air-fuel ratio is set to an air-fuel ratio corresponding to the output of the downstream side air-fuel ratio sensor 41 when the oxygen storage amount of the upstream side catalyst 20 increases and the atmosphere of the upstream side catalyst 20 changes from the stoichiometric air-fuel rate to lean.

The first rich set air-fuel ratio is preset and is an air-fuel ratio richer than the stoichiometric air-fuel ratio. Further, the reference amount is preset and is a value lower than the maximum oxygen storage amount of the upstream side catalyst 20. When the target air-fuel ratio is maintained at an air-fuel ratio richer than the stoichiometric air-fuel ratio, the upstream side catalyst 20 discharges oxygen, so the value of the oxygen excess/deficiency becomes negative. For this reason, the air-fuel ratio control device calculates the amount of change of the oxygen storage amount of the upstream side catalyst 20 as the absolute value of the cumulative value of the oxygen excess/deficiency with respect to the stoichiometric air-fuel ratio of the inflowing exhaust gas.

When the output air-fuel ratio of the downstream side air-fuel ratio sensor 41 is near the first lean judged air-fuel ratio, the oxygen storage amount of the upstream side catalyst 20 is close to the maximum oxygen storage amount. For this reason, if the air-fuel ratio of the inflowing exhaust gas deviates to the lean side from the target air-fuel ratio when the output air-fuel ratio of the downstream side air-fuel ratio sensor 41 is near the first lean judged air-fuel ratio, a large amount of $NO_X$ is liable to flow out from the upstream side catalyst 20. In this case, to keep $NO_X$ from flowing out, it is necessary to increase the rich degree of the air-fuel ratio of the inflowing exhaust gas.

For this reason, in the present embodiment, if the output air-fuel ratio of the downstream side air-fuel ratio sensor 41 reaches the second lean judged air-fuel ratio, the air-fuel ratio control device sets the target air-fuel ratio to the second rich set air-fuel ratio when the output air-fuel ratio of the downstream side air-fuel ratio sensor 41 reaches the second lean judged air-fuel ratio, and switches the target air-fuel ratio from the second rich set air-fuel ratio to the first rich set air-fuel ratio when the output air-fuel ratio of the downstream side air-fuel ratio sensor 41 becomes a value at the stoichiometric air-fuel ratio side from the second lean judged air-fuel ratio. In other words, if the output air-fuel ratio of the downstream side air-fuel ratio sensor 41 reaches the second lean judged air-fuel ratio, the air-fuel ratio control device maintains the target air-fuel ratio at the second rich set air-fuel ratio from when the output air-fuel ratio of the downstream side air-fuel ratio sensor 41 reaches the second lean judged air-fuel ratio until it becomes a value at the stoichiometric air-fuel ratio side from the second lean judged air-fuel ratio.

The second lean judged air-fuel ratio is preset and is an air-fuel ratio richer than the stoichiometric air-fuel ratio. Further, the second lean judged air-fuel ratio is leaner than the first lean judged air-fuel ratio. That is, the second lean degree of the lean judged air-fuel ratio is larger than the lean degree of the first lean judged air-fuel ratio. Further, the second lean judged air-fuel ratio is set to an air-fuel ratio corresponding to the output of the downstream side air-fuel ratio sensor 41 when a predetermined amount of $NO_X$ flows out from the upstream side catalyst 20.

The second rich set air-fuel ratio is preset and is an air-fuel ratio richer than the stoichiometric air-fuel ratio. Further, the second rich set air-fuel ratio is richer than the first rich set air-fuel ratio. That is, the rich degree of the second rich set air-fuel ratio is greater than the rich degree of the first rich set air-fuel ratio.

<Explanation of Air-Fuel Ratio Control Using Time Chart>

Figure 11:
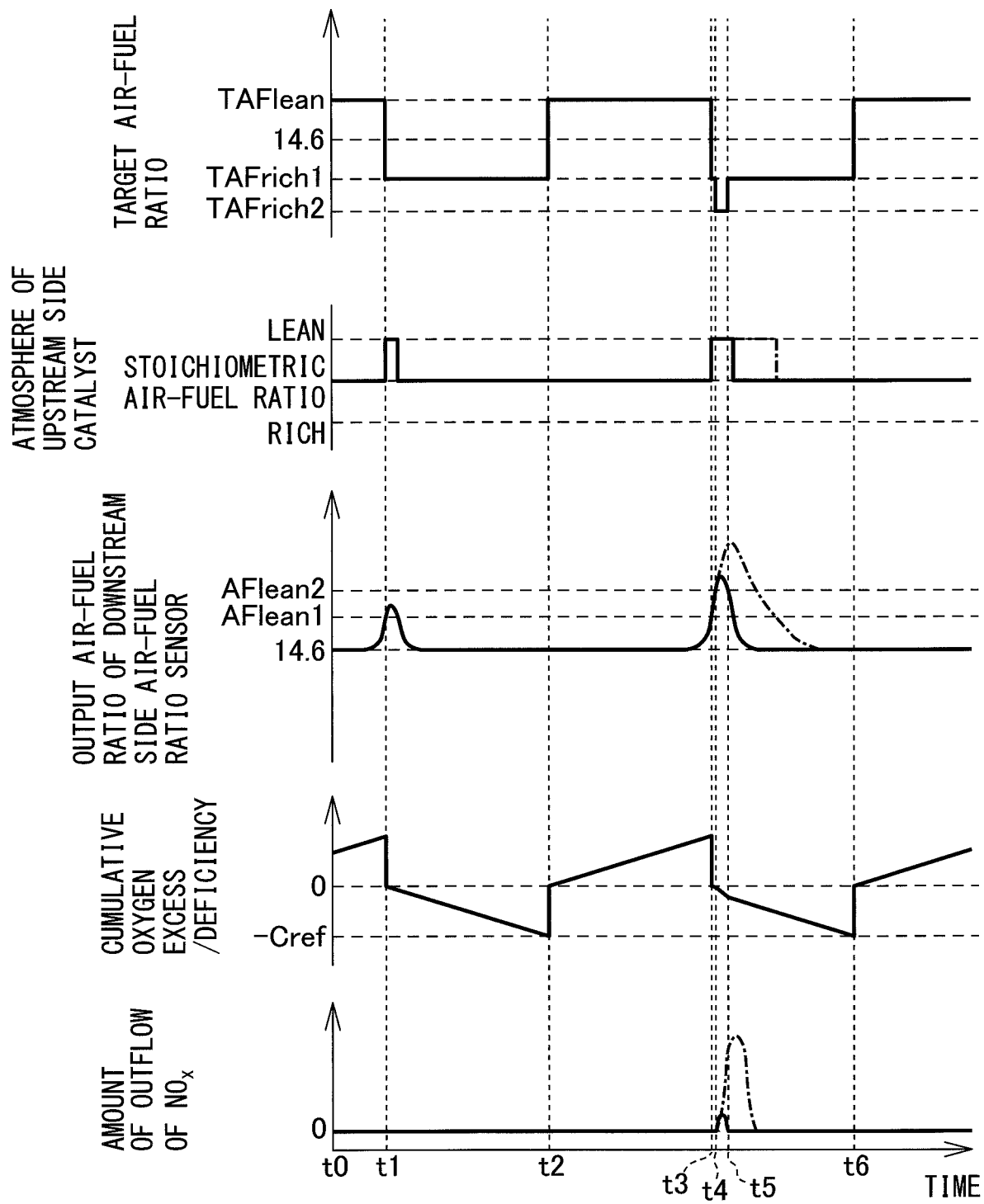
FIG. 11 is a time chart showing a target air-fuel ratio etc., of inflowing exhaust gas when the air-fuel ratio control in a third embodiment is performed.

Referring to FIG. 11, the air-fuel ratio control in the third embodiment will be explained specifically. FIG. 11 is a time chart of parameters when the air-fuel ratio control in the third embodiment is performed such as the target air-fuel ratio of the inflowing exhaust gas, the atmosphere of the upstream side catalyst 20, the output air-fuel ratio of the downstream side air-fuel ratio sensor 41, the cumulative value of the oxygen excess/deficiency with respect to the stoichiometric air-fuel ratio of the inflowing exhaust gas (cumulative oxygen excess/deficiency), and the amount of $NO_X$ flowing out from the upstream side catalyst 20. The cumulative value of the oxygen excess/deficiency is calculated by cumulatively adding the oxygen excess/deficiency calculated by the above formula (2) or (3). In FIG. 11, the solid line shows the time chart in the third embodiment while the one-dot chain line shows the time chart in the comparative example of the third embodiment.

In the illustrated example, at the time t0, the target air-fuel ratio is set to the lean set air-fuel ratio TAFlean and the air-fuel ratio of the inflowing exhaust gas becomes leaner than the stoichiometric air-fuel ratio. For this reason, the upstream side catalyst 20 stores the excess oxygen in the inflowing exhaust gas. At the time t0, the oxygen storage amount of the upstream side catalyst 20 is sufficiently smaller than the maximum oxygen storage amount, and the atmosphere of the upstream side catalyst 20 is the stoichiometric air-fuel ratio. In this case, due to the purification at the upstream side catalyst 20, the outflowing exhaust gas does not contain unburned gas and $NO_X$, so the output air-fuel ratio of the downstream side air-fuel ratio sensor 41 becomes substantially the stoichiometric air-fuel ratio.

After the time t0, the cumulative oxygen excess/deficiency gradually increases. If the oxygen storage amount of the upstream side catalyst 20 approaches the maximum oxygen storage amount, the atmosphere of the upstream side catalyst 20 changes from the stoichiometric air-fuel rate to lean. As a result, at the time t1, the output air-fuel ratio of the downstream side air-fuel ratio sensor 41 reaches the first lean judged air-fuel ratio AFlean1.

To reduce the oxygen storage amount of the upstream side catalyst 20, at the time t1, the target air-fuel ratio is switched from the lean set air-fuel ratio TAFlean to the first rich set air-fuel ratio TAFrich1. As a result, the air-fuel ratio of the inflowing exhaust gas becomes richer than the stoichiometric air-fuel ratio, the upstream side catalyst 20 discharges the amount of oxygen corresponding to the amount insufficient for oxidizing the unburned gas. Further, at the time t1, the cumulative oxygen excess/deficiency is reset to zero.

After the time t1, the cumulative oxygen excess/deficiency gradually increases. At the time t2, the absolute value of the cumulative oxygen excess/deficiency reaches the reference amount Cref. For this reason, to make the oxygen storage amount of the upstream side catalyst 20 increase, at the time t2, the target air-fuel ratio is switched from the first rich set air-fuel ratio TAFrich1 to the lean set air-fuel ratio TAFlean. As a result, the air-fuel ratio of the inflowing exhaust gas becomes leaner than the stoichiometric air-fuel ratio, and the upstream side catalyst 20 stores the excess oxygen in the inflowing exhaust gas.

After that, when the oxygen storage amount of the upstream side catalyst 20 approaches the maximum oxygen storage amount, the atmosphere of the upstream side catalyst 20 changes from the stoichiometric air-fuel rate to lean. As a result, at the time t3, the output air-fuel ratio of the downstream side air-fuel ratio sensor 41 reaches the first lean judged air-fuel ratio AFlean1.

To make the oxygen storage amount of the upstream side catalyst 20 decrease, at the time t3, the target air-fuel ratio is switched from the lean set air-fuel ratio TAFlean to the first rich set air-fuel ratio TAFrich1. However, due to the effect of external disturbance, the air-fuel ratio of the inflowing exhaust gas deviates to the lean side from the target air-fuel ratio, and at the time t4, the output air-fuel ratio of the downstream side air-fuel ratio sensor 41 reaches the second lean judged air-fuel ratio AFlean2.

To keep $NO_X$ from flowing out, at the time t4, the target air-fuel ratio is switched from the first rich set air-fuel ratio TAFrich1 to the second rich set air-fuel ratio TAFrich2. That is, the rich degree of the target air-fuel ratio is made larger. As a result, at the time t5, the output air-fuel ratio of the downstream side air-fuel ratio sensor 41 becomes a value at the stoichiometric air-fuel ratio side from the second lean judged air-fuel ratio AFlean2. That is, at the time t5, the output air-fuel ratio of the downstream side air-fuel ratio sensor 41 becomes richer than the second lean judged air-fuel ratio AFlean2.

At the time t5, the target air-fuel ratio is switched from the second rich set air-fuel ratio TAFrich2 to the first rich set air-fuel ratio TAFrich1. That is, the rich degree of the target air-fuel ratio is made smaller. After the time t5, along with the decrease of the oxygen storage amount of the upstream side catalyst 20, the atmosphere of the upstream side catalyst 20 changes from lean to the stoichiometric air-fuel ratio. Further, the output air-fuel ratio of the downstream side air-fuel ratio sensor 41 converges at the stoichiometric air-fuel ratio.

On the other hand, in the comparative example shown by the one-dot chain line, after the time t3, the target air-fuel ratio is maintained at the first rich set air-fuel ratio TAFrich1. In this case, after the time t3, the time period until the output air-fuel ratio of the downstream side air-fuel ratio sensor 41 converges at the stoichiometric air-fuel ratio becomes longer and a large amount of $NO_X$ flows out from the upstream side catalyst 20. On the other hand, in the third embodiment, only a small amount of $NO_X$ flows out from the upstream side catalyst 20. Therefore, according to the air-fuel ratio control in the third embodiment, it is possible to keep the exhaust emission from deteriorating if the air-fuel ratio of the inflowing exhaust gas fluctuates due to external disturbance.

After that, in the third embodiment, the cumulative oxygen excess/deficiency gradually falls. At the time t6, the absolute value of the cumulative oxygen excess/deficiency reaches the reference amount Cref. For this reason, to make the oxygen storage amount of the upstream side catalyst 20 increase, at the time t6, the target air-fuel ratio is switched from the first rich set air-fuel ratio TAFrich1 to the lean set air-fuel ratio TAFlean.

In the third embodiment, the rich degree of the target air-fuel ratio is made larger until the output air-fuel ratio of the downstream side air-fuel ratio sensor 41 becomes richer than the second lean judged air-fuel ratio AFlean2 only if the output air-fuel ratio of the downstream side air-fuel ratio sensor 41 has reached second lean judged air-fuel ratio AFlean2. For this reason, it is possible to shorten the time period during which the fuel injection amount becomes extremely large with respect to the intake air amount and in turn possible to keep the fuel efficiency of the internal combustion engine from deteriorating.

In the example of FIG. 11, when the output air-fuel ratio of the downstream side air-fuel ratio sensor 41 reaches the second lean judged air-fuel ratio AFlean2, the target air-fuel ratio is switched from the first rich set air-fuel ratio TAFrich1 to the second rich set air-fuel ratio TAFrich2. However, if the output air-fuel ratio of the downstream side air-fuel ratio sensor 41 rapidly changes from the stoichiometric air-fuel ratio to the second lean judged air-fuel ratio AFlean2, the target air-fuel ratio may be directly switched from the first lean set air-fuel ratio TAFlean1 to the second rich set air-fuel ratio TAFrich2.

<Processing for Setting Target Air-Fuel Ratio>

Below, the air-fuel ratio control in the third embodiment will be explained in detail. Note that, in the third embodiment, in the same way as the second embodiment, the block diagram of control for the air-fuel ratio control shown in FIG. 9 will be used.

FIG. 12 is a flow chart showing a control routine of processing for setting the target air-fuel ratio in the third embodiment. The control routine is repeatedly performed at predetermined time intervals by the ECU 31 after startup of the internal combustion engine.

First, at, at step S301, it is judged whether the output air-fuel ratio AFdwn of the downstream side air-fuel ratio sensor 41 is the first lean judged air-fuel ratio AFlean1 or more. If it is judged that the output air-fuel ratio AFdwn of the downstream side air-fuel ratio sensor 41 is the first lean judged air-fuel ratio AFlean1 or more, the present control routine proceeds to step S302.

At step S302, it is judged whether the output air-fuel ratio AFdwn of the downstream side air-fuel ratio sensor 41 is the second lean judged air-fuel ratio AFlean2 or more. If it is judged that the output air-fuel ratio AFdwn of the downstream side air-fuel ratio sensor 41 is lower than the second lean judged air-fuel ratio AFlean2, the present control routine proceeds to step S303. At step S303, the target air-fuel ratio TAF is set to the first rich set air-fuel ratio TAFrich1. Note that, if the current target air-fuel ratio TAF is the first rich set air-fuel ratio TAFrich1, the target air-fuel ratio TAF is maintained at the first rich set air-fuel ratio TAFrich1. After step S303, the present control routine ends.

On the other hand, if at step S302 it is judged that the output air-fuel ratio AFdwn of the downstream side air-fuel ratio sensor 41 is the second lean judged air-fuel ratio AFlean2 or more, the present control routine proceeds to step S304. At step S304, the target air-fuel ratio TAF is set to the second rich set air-fuel ratio TAFrich2. Note that, if the current target air-fuel ratio TAF is the second rich set air-fuel ratio TAFrich2, the target air-fuel ratio TAF is maintained at the second rich set air-fuel ratio TAFrich2. After step S304, the present control routine ends.

Further, if at step S301 it is judged that the output air-fuel ratio AFdwn of the downstream side air-fuel ratio sensor 41 is lower than the first lean judged air-fuel ratio AFlean1, the present control routine proceeds to step S305. At step S305, it is judged whether the absolute value of the cumulative oxygen excess/deficiency ΣOED is the reference amount Cref or more.

The reference amount Cref is, for example, set to a value of 0.2 to 0.8 time the maximum oxygen storage amount of the upstream side catalyst 20 in the unused state. Note that, the reference amount Cref may be set to a value of 0.2 to 0.8 time the maximum oxygen storage amount of the upstream side catalyst 20 calculated by a known means.

The cumulative oxygen excess/deficiency ΣOED is calculated by cumulatively adding the oxygen excess/deficiency calculated by the above formula (2) or (3). Further, the cumulative oxygen excess/deficiency ΣOED is reset to zero when the target air-fuel ratio TAF is switched from the lean set air-fuel ratio TAFlean to the first rich set air-fuel ratio TAFrich1 and when the target air-fuel ratio TAF is switched from first rich set air-fuel ratio TAFrich1 to the lean set air-fuel ratio TAFlean. Note that, if the target air-fuel ratio TAF is directly switched from the lean set air-fuel ratio TAFlean to the second rich set air-fuel ratio TAFrich2, the cumulative oxygen excess/deficiency ΣOED is reset to zero when the target air-fuel ratio TAF is switched from the lean set air-fuel ratio TAFlean to the second rich set air-fuel ratio TAFrich2.

If at step S305 it is judged that the absolute value of the cumulative oxygen excess/deficiency ΣOED is the reference amount Cref or more, the present control routine proceeds to step S306. At step S306, the target air-fuel ratio TAF is set to the lean set air-fuel ratio TAFlean. Note that, if the current target air-fuel ratio TAF is the lean set air-fuel ratio TAFlean, the target air-fuel ratio TAF is maintained at the lean set air-fuel ratio TAFlean. After step S306, the present control routine ends.

On the other hand, if at step S305 it is judged that the absolute value of the cumulative oxygen excess/deficiency ΣOED is less than the reference amount Cref, the present control routine ends. In this case, the target air-fuel ratio TAF is maintained at the currently set value.

As will be clear from the above explanation, in first embodiment, second embodiment, and third embodiment, the following air-fuel ratio control is performed.

The air-fuel ratio control device sets the target air-fuel ratio to the first set air-fuel ratio, then switches the target air-fuel ratio from the first set air-fuel ratio to the second set air-fuel ratio when the output air-fuel ratio of the downstream side air-fuel ratio sensor reaches the first judged air-fuel ratio. The first set air-fuel ratio and first judged air-fuel ratio are air-fuel ratios in the first region richer or leaner than the stoichiometric air-fuel ratio, while the second set air-fuel ratio is an air-fuel ratio in a second region at the opposite side from the first region across the stoichiometric air-fuel ratio.

Further, if the output air-fuel ratio of the downstream side air-fuel ratio sensor reaches the second judged air-fuel ratio, the air-fuel ratio control device sets the target air-fuel ratio to the third set air-fuel ratio when the output air-fuel ratio of the downstream side air-fuel ratio sensor reaches the second judged air-fuel ratio and switches the target air-fuel ratio from the third set air-fuel ratio to the second set air-fuel ratio when the output air-fuel ratio of the downstream side air-fuel ratio sensor becomes a value at the stoichiometric air-fuel ratio side from the second judged air-fuel ratio. The second judged air-fuel ratio is an air-fuel ratio in the first region. The difference between the second judged air-fuel ratio and the stoichiometric air-fuel ratio is larger than the difference between the first judged air-fuel ratio and the stoichiometric air-fuel ratio. The third set air-fuel ratio is an air-fuel ratio in the second region. The difference between the third set air-fuel ratio and the stoichiometric air-fuel ratio is larger than the difference between the second set air-fuel ratio and the stoichiometric air-fuel ratio.

Further, in the first embodiment, the air-fuel ratio control device sets the target air-fuel ratio to the second set air-fuel ratio, then switches the target air-fuel ratio from the second set air-fuel ratio to the first set air-fuel ratio when the output air-fuel ratio of the downstream side air-fuel ratio sensor reaches a third judged air-fuel ratio. Furthermore, if the output air-fuel ratio of the downstream side air-fuel ratio sensor reaches a fourth judged air-fuel ratio, the air-fuel ratio control device sets the target air-fuel ratio to the fourth set air-fuel ratio when the output air-fuel ratio of the downstream side air-fuel ratio sensor reaches the fourth judged air-fuel ratio and switches the target air-fuel ratio from the fourth set air-fuel ratio to the first set air-fuel ratio when the output air-fuel ratio of the downstream side air-fuel ratio sensor becomes a value at the stoichiometric air-fuel ratio side from the fourth judged air-fuel ratio. The third judged air-fuel ratio and fourth judged air-fuel ratio are air-fuel ratios in the second region. The difference between the fourth judged air-fuel ratio and the stoichiometric air-fuel ratio is larger than the difference between the third judged air-fuel ratio and the stoichiometric air-fuel ratio. The fourth set air-fuel ratio is an air-fuel ratio in the first region. The difference between the fourth set air-fuel ratio and the stoichiometric air-fuel ratio is larger than the difference between the first set air-fuel ratio and the stoichiometric air-fuel ratio.

If the air-fuel ratio in the first region is an air-fuel ratio richer than the stoichiometric air-fuel ratio, the first set air-fuel ratio, second set air-fuel ratio, third set air-fuel ratio, and fourth set air-fuel ratio respectively correspond to the first rich set air-fuel ratio, first lean set air-fuel ratio, second lean set air-fuel ratio, and second rich set air-fuel ratio in the first embodiment. Further, the first judged air-fuel ratio, second judged air-fuel ratio, third judged air-fuel ratio, and fourth judged air-fuel ratio respectively correspond to the first rich judged air-fuel ratio, second rich judged air-fuel ratio, first lean judged air-fuel ratio, and second lean judged air-fuel ratio in the first embodiment.

Further, if the air-fuel ratio in the first region is an air-fuel ratio leaner than the stoichiometric air-fuel ratio, the first set air-fuel ratio, second set air-fuel ratio, third set air-fuel ratio, and fourth set air-fuel ratio respectively correspond to the first lean set air-fuel ratio, first rich set air-fuel ratio, second rich set air-fuel ratio, and second lean set air-fuel ratio in the first embodiment. Further, the first judged air-fuel ratio, second judged air-fuel ratio, third judged air-fuel ratio, and fourth judged air-fuel ratio respectively correspond to the first lean judged air-fuel ratio, second lean judged air-fuel ratio, first rich judged air-fuel ratio, and second rich judged air-fuel ratio in the first embodiment.

Further, in the second embodiment and third embodiment, the air-fuel ratio control device switches the target air-fuel ratio from the second set air-fuel ratio to the first set air-fuel ratio when judging that the amount of change of the oxygen storage amount of the upstream side catalyst 20 when the target air-fuel ratio is maintained at the air-fuel ratio in the second region reaches a reference amount.

In the second embodiment, the air-fuel ratio in the first region is an air-fuel ratio richer than the stoichiometric air-fuel ratio. Further, the first set air-fuel ratio, second set air-fuel ratio, and third set air-fuel ratio respectively correspond to the rich set air-fuel ratio, first lean set air-fuel ratio, and second lean set air-fuel ratio in the second embodiment. Further, the first judged air-fuel ratio and second judged air-fuel ratio respectively correspond to the first rich judged air-fuel ratio and second rich judged air-fuel ratio in the second embodiment.

In the third embodiment, the air-fuel ratio in the first region is an air-fuel ratio leaner than the stoichiometric air-fuel ratio. Further, the first set air-fuel ratio, second set air-fuel ratio, and third set air-fuel ratio respectively correspond to the lean set air-fuel ratio, first rich set air-fuel ratio, and second rich set air-fuel ratio in the third embodiment. Further, the first judged air-fuel ratio and second judged air-fuel ratio respectively correspond to the first lean judged air-fuel ratio and second lean judged air-fuel ratio in the third embodiment.

Above, preferred embodiments according to the present invention were explained, but the present invention is not limited to these embodiments and can be revised and changed in various ways within the language of the claims. As explained above, the air-fuel ratio of the inflowing exhaust gas may be controlled without using the upstream side air-fuel ratio sensor 40 and the oxygen excess/deficiency with respect to the stoichiometric air-fuel ratio of the inflowing exhaust gas may be calculated without using the upstream side air-fuel ratio sensor 40. Further, the harmful substances in the exhaust gas are basically removed at the upstream side catalyst 20. For this reason, at least one of the upstream side air-fuel ratio sensor 40 and downstream side catalyst 24 may be omitted from the exhaust purification system.

REFERENCE SIGNS LIST

20. upstream side catalyst
31. ECU
40. upstream side air-fuel ratio sensor
41. downstream side air-fuel ratio sensor

The invention claimed is:

1. An exhaust purification system of an internal combustion engine comprising:
   a catalyst arranged in an exhaust passage and able to store oxygen;
   a downstream side air-fuel ratio sensor arranged at a downstream side of the catalyst in a direction of flow of exhaust and detecting an air-fuel ratio of outflowing exhaust gas flowing out from the catalyst; and
   an air-fuel ratio control device configured to control an air-fuel ratio of inflowing exhaust gas flowing into the catalyst to a target air-fuel ratio, wherein
   the air-fuel ratio control device is configured to set the target air-fuel ratio to a first set air-fuel ratio, then, switch the target air-fuel ratio from the first set air-fuel ratio to a second set air-fuel ratio when the air-fuel ratio detected by the downstream side air-fuel ratio sensor reaches a first judged air-fuel ratio,
   the first set air-fuel ratio and the first judged air-fuel ratio are air-fuel ratios in a first region richer or leaner than a stoichiometric air-fuel ratio, and the second set air-fuel ratio is an air-fuel ratio in a second region at an opposite side from the first region across the stoichiometric air-fuel ratio,
   if the air-fuel ratio detected by the downstream side air-fuel ratio sensor reaches a second judged air-fuel ratio, the air-fuel ratio control device is configured to set the target air-fuel ratio to a third set air-fuel ratio when the air-fuel ratio detected by the downstream side air-fuel ratio sensor reaches the second judged air-fuel ratio, and switch the target air-fuel ratio from the third set air-fuel ratio to the second set air-fuel ratio when the air-fuel ratio detected by the downstream side air-fuel ratio sensor becomes a value at the stoichiometric air-fuel ratio side from the second judged air-fuel ratio, and
   the second judged air-fuel ratio is an air-fuel ratio in the first region, a difference of the second judged air-fuel ratio and the stoichiometric air-fuel ratio is larger than a difference of the first judged air-fuel ratio and the stoichiometric air-fuel ratio, the third set air-fuel ratio is an air-fuel ratio in the second region, and a difference of the third set air-fuel ratio and the stoichiometric air-fuel ratio is larger than a difference of the second set air-fuel ratio and the stoichiometric air-fuel ratio.

2. The exhaust purification system of an internal combustion engine according to claim 1, wherein
   the air-fuel ratio control device is configured to set the target air-fuel ratio to the second set air-fuel ratio, then switch the target air-fuel ratio from the second set air-fuel ratio to the first set air-fuel ratio when the air-fuel ratio detected by the downstream side air-fuel ratio sensor reaches a third judged air-fuel ratio,
   if the air-fuel ratio detected by the downstream side air-fuel ratio sensor reaches a fourth judged air-fuel ratio, the air-fuel ratio control device is configured to set the target air-fuel ratio to a fourth set air-fuel ratio when the air-fuel ratio detected by the downstream side air-fuel ratio sensor reaches the fourth judged air-fuel ratio, and switch the target air-fuel ratio from the fourth set air-fuel ratio to the first set air-fuel ratio when the air-fuel ratio detected by the downstream side air-fuel ratio sensor becomes a value at the stoichiometric air-fuel ratio side from the fourth judged air-fuel ratio, and
   the third judged air-fuel ratio and the fourth judged air-fuel ratio are air-fuel ratios in the second region, a difference between the fourth judged air-fuel ratio and the stoichiometric air-fuel ratio is greater than a difference between the third judged air-fuel ratio and the stoichiometric air-fuel ratio, the fourth set air-fuel ratio is an air-fuel ratio in the first region, and a difference of the fourth set air-fuel ratio and the stoichiometric air-fuel ratio is larger than a difference between the first set air-fuel ratio and the stoichiometric air-fuel ratio.

3. The exhaust purification system of an internal combustion engine according to claim 1, wherein the air-fuel ratio control device is configured to switch the target air-fuel ratio from the second set air-fuel ratio to the first set air-fuel ratio when judging that an amount of change of an oxygen storage amount of the catalyst when the target air-fuel ratio is maintained at the air-fuel ratio in the second region has reached a reference amount.

4. The exhaust purification system of an internal combustion engine according to claim 1, further comprising an upstream side air-fuel ratio sensor arranged at an upstream side of the catalyst in the direction of flow of exhaust and detecting an air-fuel ratio of the inflowing exhaust gas, wherein
   the air-fuel ratio control device is configured to control an amount of fuel supplied to combustion chambers by feedback so that the air-fuel ratio detected by the upstream side air-fuel ratio sensor matches the target air-fuel ratio.

5. The exhaust purification system of an internal combustion engine according to claim 2, further comprising an upstream side air-fuel ratio sensor arranged at an upstream side of the catalyst in the direction of flow of exhaust and detecting an air-fuel ratio of the inflowing exhaust gas, wherein
   the air-fuel ratio control device is configured to control an amount of fuel supplied to combustion chambers by feedback so that the air-fuel ratio detected by the upstream side air-fuel ratio sensor matches the target air-fuel ratio.

6. The exhaust purification system of an internal combustion engine according to claim 3, further comprising an upstream side air-fuel ratio sensor arranged at an upstream side of the catalyst in the direction of flow of exhaust and detecting an air-fuel ratio of the inflowing exhaust gas, wherein the air-fuel ratio control device is configured to control an amount of fuel supplied to combustion chambers by feedback so that the air-fuel ratio detected by the upstream side air-fuel ratio sensor matches the target air-fuel ratio.

* * * * *